United States Patent
Ishida et al.

(10) Patent No.: US 9,751,583 B2
(45) Date of Patent: Sep. 5, 2017

(54) ENGINE SUPPORTING STRUCTURE FOR SADDLE RIDING TYPE VEHICLE

(71) Applicant: HONDA MOTOR CO., LTD., Tokyo (JP)

(72) Inventors: Shinichiro Ishida, Wako (JP); Jun Fujii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/882,972

(22) Filed: Oct. 14, 2015

(65) Prior Publication Data

US 2016/0107714 A1    Apr. 21, 2016

(30) Foreign Application Priority Data

Oct. 16, 2014  (JP) ................. 2014-211999

(51) Int. Cl.
*B62K 11/04*    (2006.01)
*B62K 25/00*    (2006.01)

(52) U.S. Cl.
CPC .............. *B62K 11/04* (2013.01); *B62K 25/00* (2013.01); *B62K 2700/34* (2013.01)

(58) Field of Classification Search
CPC ..... B62K 11/04; B62K 25/00; B62K 2700/34
See application file for complete search history.

(56) References Cited

U.S. PATENT DOCUMENTS

| 5,261,504 A * | 11/1993 | Katsura ................. B62K 11/04 180/219 |
| 7,296,814 B2 * | 11/2007 | Miyamoto ............. B62K 19/12 180/219 |
| 2013/0098701 A1 * | 4/2013 | Hirano ................... B62K 11/04 180/227 |

FOREIGN PATENT DOCUMENTS

JP    11-263268 A    9/1999

* cited by examiner

*Primary Examiner* — Kevin Hurley
*Assistant Examiner* — Marlon A Arce
(74) *Attorney, Agent, or Firm* — Squire Patton Boggs (US) LLP

(57) ABSTRACT

A saddle ride type vehicle that may include an engine supporting structure and an engine including a crankcase portion and a cylinder portion. The engine may be supported in a lower portion of the vehicle body frame by a front upper hanger portion and a front lower hanger portion. The front upper hanger portion, the front lower hanger portion, and a pivot supporting hole portion may be high-rigidity hangers having high rigidity, and the engine may be supported in the vehicle body frame by a rear lower hanger portion, a rear upper hanger portion, and a cylinder portion hanger portion having low rigidity which portions are provided between the high-rigidity hangers along the frame bodies.

12 Claims, 12 Drawing Sheets

ENGINE SUPPORTING STRUCTURE FOR SADDLE RIDING TYPE VEHICLE

BACKGROUND

Field

The present invention relates to an engine supporting structure for a saddle riding type vehicle.

Description of the Related Art

As a conventional technology, a structure is disclosed in which an engine is disposed within frames of a vehicle body frame of a saddle riding type vehicle, and the engine is supported in the vehicle body frame at a plurality of positions (see Japanese Patent Laid-Open No. Hei 11-263268, hereinafter Patent Document 1, for example).

As in the conventional engine supporting structure, the frames of the vehicle body frame can be reinforced by the engine by supporting the engine in the vehicle body frame. However, when a large load is input from a front wheel or a rear wheel during traveling on rough terrain or the like, the load is desirably distributed by making the vehicle body frame elastically deformed moderately to improve the riding comfort of an occupant.

SUMMARY

The present invention has been made in view of the above-described circumstances. It is an object of embodiments of the present invention to improve the riding comfort of an occupant by making a vehicle body frame elastically deformed moderately in an engine supporting structure for a saddle riding type vehicle.

In order to achieve the above object, according to certain embodiments of the present invention, there is provided an engine supporting structure for a saddle riding type vehicle. The engine supporting structure can include a vehicle body frame including frame bodies formed, as viewed from a side, by a head pipe, a pair of left and right main frames extending rearward from the head pipe, a pair of left and right pivot frames extending downward from rear portions of the main frames, a down frame extending downward from the head pipe, and a pair of left and right lower frames extending rearward from a lower end of the down frame and connected to lower ends of the pair of left and right pivot frames. The left and right pivot frames are coupled to each other by a cross member. An engine includes a crankcase portion supporting a crankshaft and a cylinder portion extending upward from the crankcase portion. The engine is supported in a lower portion of the vehicle body frame by a front hanger provided to at least one of the down frame and the lower frames to support a front portion of the crankcase portion and a rear hanger provided to the pivot frames to support a rear portion of the crankcase portion. The front hanger and the rear hanger are high-rigidity hangers having high rigidity. The engine is supported in the vehicle body frame by a low-rigidity hanger, having lower rigidity than the high rigidity hanger, provided between the high-rigidity hangers along the frame bodies of the vehicle body frame.

The engine is supported in the lower portion of the vehicle body frame by the front hanger provided to at least one of the down frame and the lower frames to support the front portion of the crankcase portion and the rear hanger provided to the pivot frames to support the rear portion of the crankcase portion, the front hanger and the rear hanger being high-rigidity hangers having high rigidity, and the engine is supported in the vehicle body frame by the low-rigidity hanger provided between the high-rigidity hangers along the frame bodies of the vehicle body frame. The front hanger and the rear hanger as high-rigidity hangers thus support the crankcase portion in the lower portion of the vehicle body frame. Therefore, the rigidity of the lower portions of the frame bodies of the vehicle body frame can be increased effectively by the crankcase portion, and the crankcase portion can be supported well. Parts between the front and rear high-rigidity hangers in the frame bodies support the engine via the low-rigidity hanger. Thus, the vehicle body frame can be moderately elastically deformed at the part of the low-rigidity hanger while the engine is supported by the low-rigidity hanger. The riding comfort of the occupant can therefore be improved by making the vehicle body frame moderately elastically deformed in response to a load from the outside.

In addition, according to certain embodiments, the front hanger includes a front upper hanger provided to the down frame to support a front upper portion of the crankcase portion and a front lower hanger provided to the lower frames to support a front lower portion of the crankcase portion. The high-rigidity hangers are formed by three pieces including the front upper hanger, the front lower hanger, and the rear hanger. A first low-rigidity hanger is provided; the first low-rigidity hanger is disposed on the down frame between the front upper hanger and the rear hanger as viewed from the side to support a front portion of the cylinder portion.

The high-rigidity hangers are formed by the three pieces including the front upper hanger, the front lower hanger, and the rear hanger, and the first low-rigidity hanger is provided which is disposed on the down frame between the front upper hanger and the rear hanger as viewed from the side to support the front portion of the cylinder portion. Thus, the crankcase portion can be supported by the three pieces of the high-rigidity hangers. In addition, because the first low-rigidity hanger provided to the down frame between the high-rigidity hangers supports the cylinder portion, the down frame can be moderately elastically deformed while the cylinder portion is prevented from being greatly shaken.

In addition, according to certain embodiments, a second low-rigidity hanger is provided, the second low-rigidity hanger being disposed on an upper cross member coupling upper portions of the left and right pivot frames to each other between the front upper hanger and the rear hanger as viewed from the side. The second low-rigidity hanger supports an upper portion of the crankcase portion.

The second low-rigidity hanger is provided which is disposed on the upper cross member coupling the upper portions of the left and right pivot frames between the front upper hanger and the rear hanger as viewed from the side, and which supports the upper portion of the crankcase portion. Therefore, the upper portion of the crankcase portion is supported by the second low-rigidity hanger of the upper cross member, and the main frames do not need to support the upper portion of the crankcase portion. Thus, the main frames can be moderately elastically deformed. In addition, the second low-rigidity hanger can reinforce the supporting of the crankcase portion, and make the rigidity of a portion around the upper portions of the pivot frames moderately high.

Further, according to certain embodiments, the main frames extend rearward while bending leftwardly outward and rightwardly outward, respectively, from the head pipe, and the main frames are not provided with an engine hanger for supporting the engine.

The main frames are not provided with an engine hanger for supporting the engine. Therefore, the main frames, which are allowed by the bent shape to be moderately elastically deformed, can be effectively bent without being restricted by the engine. The riding comfort of the occupant can thus be improved.

In addition, the pivot frames can include a lower cross member coupling lower portions of the left and right pivot frames to each other, and include a link rod supporting portion supporting a swing arm in rear of the lower cross member, and a third low-rigidity hanger is provided. The third low-rigidity hanger can be disposed between the front lower hanger and the rear hanger as viewed from the side so as to be supported by the link rod supporting portion and so as to straddle the lower cross member. The third low-rigidity hanger supports a lower portion of the crankcase portion.

The third low-rigidity hanger is provided which is disposed between the front lower hanger and the rear hanger as viewed from the side so as to be supported by the link rod supporting portion in the rear of the lower cross member and so as to straddle the lower cross member, and which supports the lower portion of the crankcase portion. The lower portion of the crankcase portion is thereby supported by the longitudinally long third low-rigidity hanger that straddles the lower cross member from the link rod supporting portion in the rear of the lower cross member and which supports the lower portion of the crankcase portion. Thus, the third low-rigidity hanger can reinforce the supporting of the crankcase portion, and make the rigidity of a portion around the lower portions of the pivot frames moderately high.

In addition, according to certain embodiments, the lower frames are each a pipe-shaped frame having a smaller cross-sectional area than each of the main frames, the down frame, and the pivot frames.

The lower frames are each a pipe-shaped frame having a smaller cross-sectional area than each of the main frames, the down frame, and the pivot frames. Thus, the lower frames can be elastically deformed moderately. The riding comfort of the occupant can therefore be improved.

The engine supporting structure for a saddle riding type vehicle according to embodiments of the present invention can improve the riding comfort of the occupant by making the vehicle body frame elastically deformed moderately in response to a load from the outside.

The crankcase portion can be supported well by the three pieces of the high-rigidity hangers, and the down frame can be elastically deformed moderately while the first low-rigidity hanger prevents the cylinder portion from being shaken greatly.

In addition, the second low-rigidity hanger can reinforce the supporting of the crankcase portion, and make the rigidity of the portion around the upper portions of the pivot frames moderately high.

In addition, the main frames can be bent effectively without being restricted by the engine. The riding comfort of the occupant can therefore be improved.

Further, the third low-rigidity hanger can reinforce the supporting of the crankcase portion, and make the rigidity of the portion around the lower portions of the pivot frames moderately high.

In addition, the lower frames can be elastically deformed moderately. The riding comfort of the occupant can therefore be improved.

DETAILED DESCRIPTION

Embodiments of the present invention will hereinafter be described with reference to the drawings. It is to be noted that in the explanation, description of directions such as front and rear, left and right, and up and down are the same as directions with respect to a vehicle body unless otherwise specified. In addition, a reference symbol FR shown in the figures indicates the front of the vehicle body, a reference symbol UP shown in the figures indicates the upward direction of the vehicle body, and a reference symbol LH shown in the figures indicates the left direction of the vehicle body.

Figure 1:
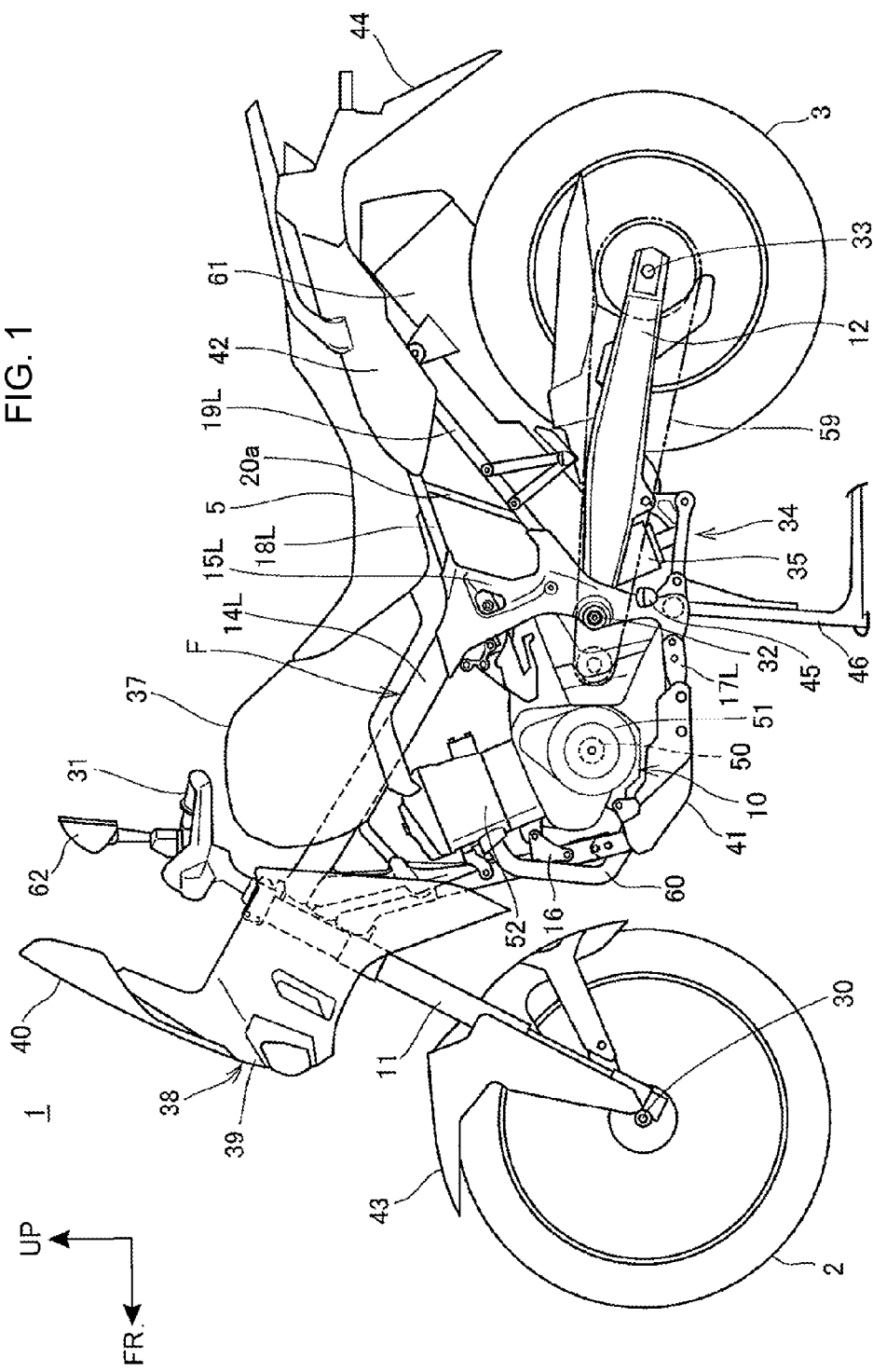
FIG. 1 is a left side view of a motorcycle according to an embodiment of the present invention.
Figure 2:
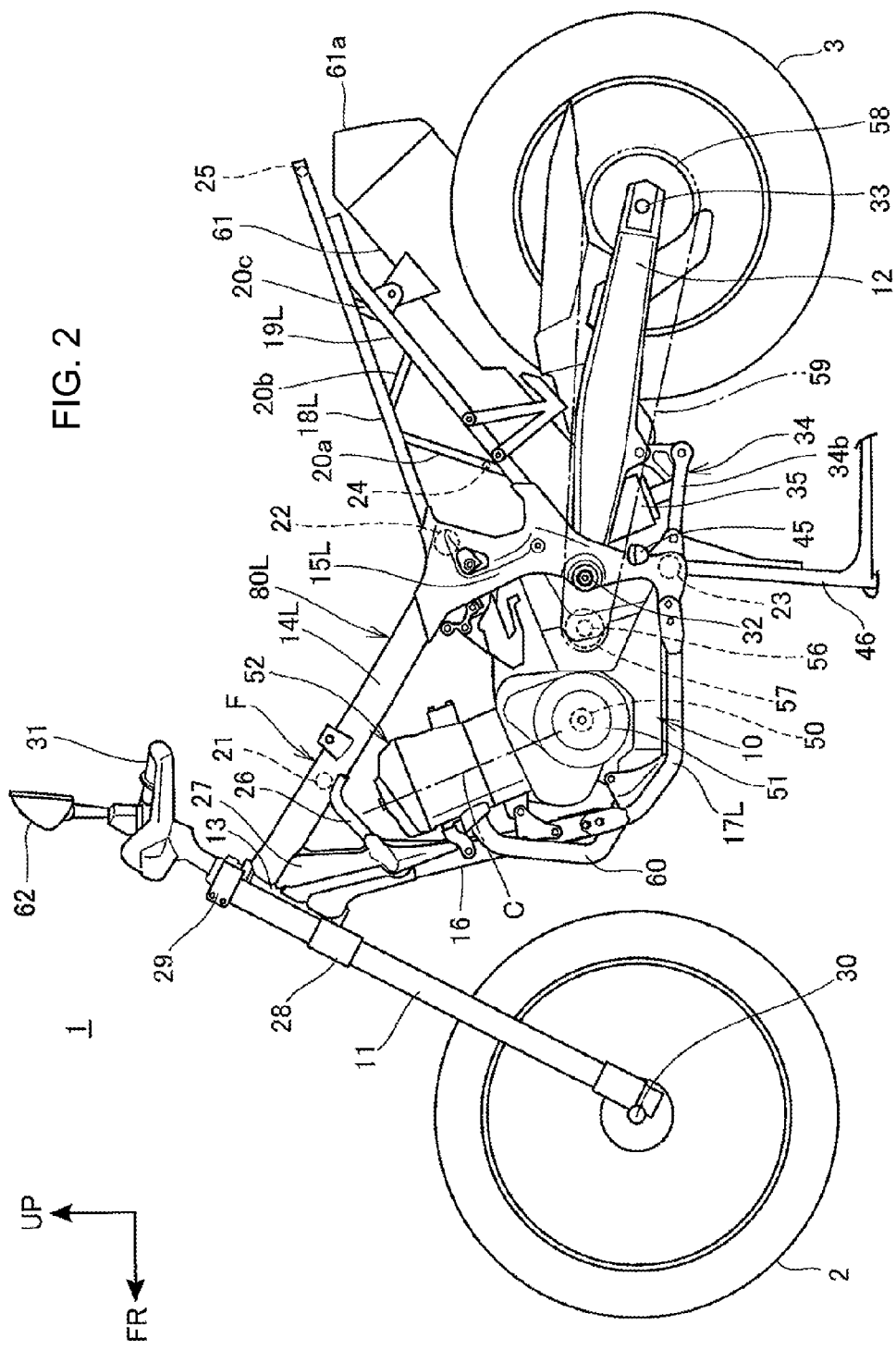
FIG. 2 is a left side view of the motorcycle in a state in which vehicle body covers and auxiliaries are removed.
Figure 3:
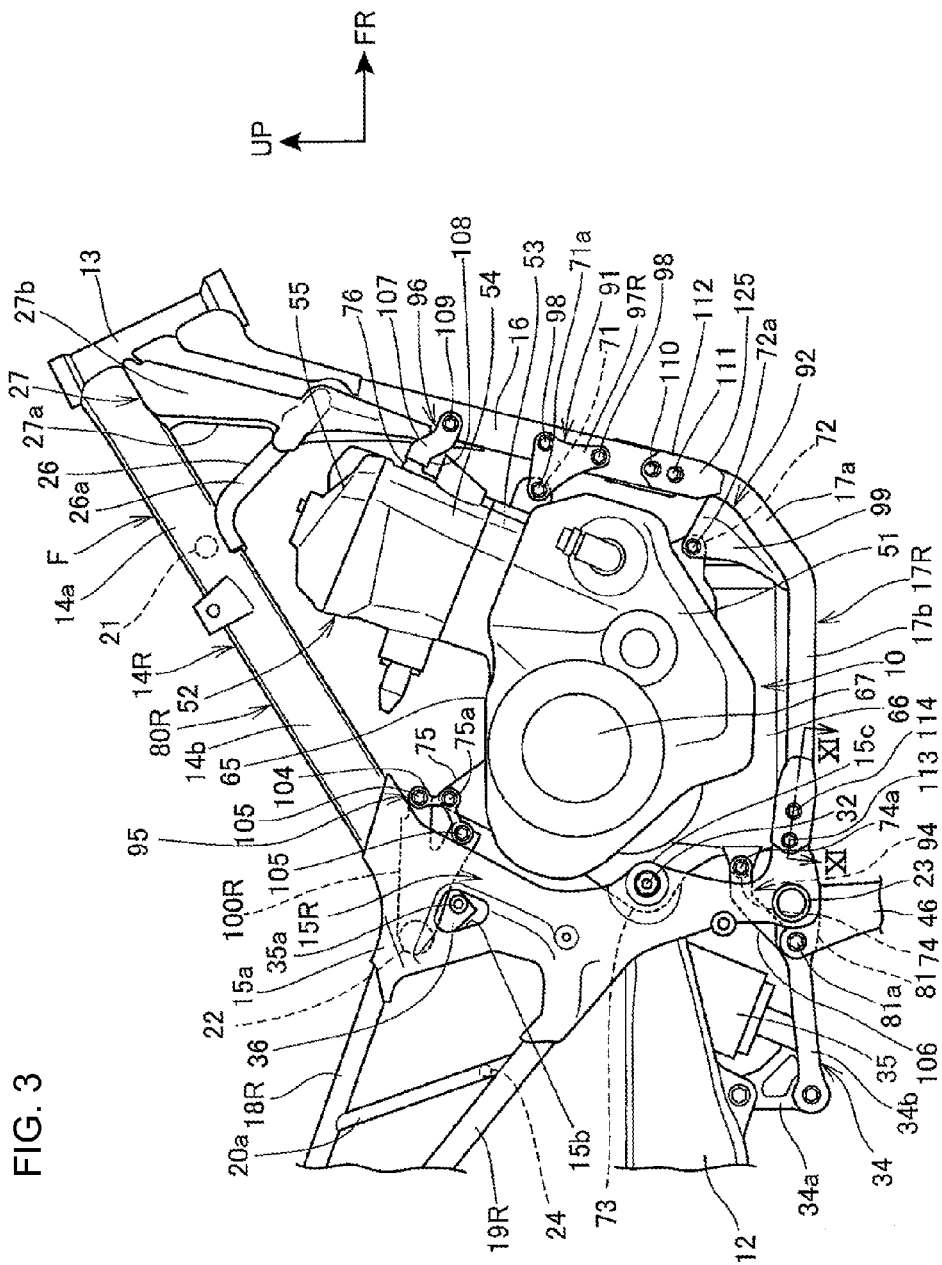
FIG. 3 is a right side view showing an engine supporting structure.

FIG. 1 is a left side view of a motorcycle according to a first embodiment of the present invention. FIG. 2 is a left side view of the motorcycle in a state in which vehicle body covers and auxiliaries are removed. FIG. 3 is a right side view showing an engine supporting structure.

A motorcycle 1 is a vehicle in which an engine 10 as a power unit is supported by a vehicle body frame F, a pair of left and right front fork members 11 supporting a front wheel 2 is steerably supported by a front end of the vehicle body frame F, and a swing arm 12 supporting a rear wheel 3 is provided to the rear side of the vehicle body frame F. The motorcycle 1 is a saddle riding type vehicle in which a seat 5 for seating an occupant such that the occupant straddles the seat 5 is provided above a longitudinally central portion of the vehicle body frame F.

The vehicle body frame F includes a head pipe 13 provided at a front end, and a pair of left and right main frames 14L and 14R that are inclined and extend in an obliquely downward direction from the head pipe 13 to the rear. A pair of left and right pivot frames 15L and 15R extend downward from rear ends of the main frames 14L and 14R, respectively. A down frame 16 extends rearwardly downward from a lower portion of the head pipe 13. A pair of left and right lower frames 17L and 17R that branch left and right from a lower end of the down frame 16, extend rearward, and are connected to lower ends of the pivot frames 15L and 15R.

The vehicle body frame F includes a pair of left and right seat frames 18L and 18R that extend rearwardly upward from upper rear portions of the pivot frames 15L and 15R to a rear end portion of the vehicle. A pair of left and right sub-frames 19L and 19R extend rearwardly upward from rear portions of vertically intermediate portions of the pivot frames 15L and 15R and are connected to rear portions of the seat frames 18L and 18R. A plurality of coupling frames 20a, 20b, and 20c vertically couple the seat frames 18L and 18R to the sub-frames 19L and 19R in the form of a truss.

The vehicle body frame F includes a front cross member 21 that couples front portions of the main frames 14L and 14R to each other in a vehicle width direction. An upper cross member 22 couples upper portions of the pivot frames 15L and 15R to each other in the vehicle width direction. A lower cross member 23 couples the lower ends of the pivot frames 15L and 15R to each other in the vehicle width direction. A rear cross member 24 couples the left and right coupling frames 20a to each other in the vehicle width direction. A rear end cross member 25 couples rear end portions of the seat frames 18L and 18R to each other in the vehicle width direction.

The vehicle body frame F can also include a stiffener frame 26 that laterally couples the main frames 14L and 14R to each other and which is coupled to the rear surface side of the down frame 16. Specifically, the stiffener frame 26 is one pipe member including front extending portions 26a that extend forwardly downward from the main frames 14L and 14R, and a vehicle width direction extending portion 26b (FIG. 9) that passes the vicinity of a rear surface of the down frame 16 and couples front ends of the front extending portions 26a to each other in the vehicle width direction.

The vehicle body frame F can have a reinforcing member 27 including a vertically long plate-shaped portion 27a that faces the rear surface of the down frame 16, and side plate-shaped portions 27b that extend frontward from left and right side edges of the plate-shaped portion 27a and are coupled to a rear portion of the down frame 16. The side plate-shaped portions 27b have front edges coupled to the down frame 16, and have upper edges coupled to the undersurfaces of the main frames 14L and 14R. Because the reinforcing member 27 is provided, a box-shaped space is formed in the rear of an upper portion of the down frame 16. The stiffener frame is disposed such that the vehicle width direction extending portion 26b passes through the inside of the box-shaped space. The stiffener frame 26 is coupled to the down frame 16 via the reinforcing member 27.

The head pipe 13 rotatably supports a steering shaft (not shown). A bottom bridge 28 and a top bridge extending in the vehicle width direction are respectively fixed to a lower end portion and an upper end portion of the steering shaft. The front fork members 11 are supported by the bottom bridge 28 and the top bridge 29. The front wheel 2 is rotatably supported by a front wheel axle 30 provided to lower ends of the front fork members 11. The driver (occupant) steers the front wheel 2 via handlebars 31 fixed to the top bridge 29.

The swing arm 12 has a front end portion rotatably supported by a pivot shaft 32 that couples the left and right pivot frames 15L and 15R to each other. The swing arm 12 vertically swings about the pivot shaft 32. The rear wheel 3 is rotatably supported by a rear wheel axle 33, which is inserted into a rear end portion of the swing arm 12.

A link member 34 coupling a front portion of the swing arm 12 to the lower cross member 23 side is coupled to the swing arm 12. A lower end of a rear suspension 35 is coupled to the link member 34. An upper end of the rear suspension 35 is coupled to a suspension stay 36 (FIG. 3) that extends forwardly downward from the upper cross member 22.

A fuel tank 37 is provided on the main frames 14L and 14R. The seat 5 is supported on the seat frames 18L and 18R, and extends rearward so as to be continuous with a rear portion of the fuel tank 37.

A vehicle body cover 38 includes a front cover 39 that covers a peripheral portion of the head pipe 13 from the front and sides, and a front screen 40 that extends upward from an upper edge of a front surface of the front cover 39. An under cover 41 covers the lower frames 17L and 17R from below, and a rear cover 42 covers the seat frames 18L and 18R and the sub-frames 19L and 19R from the sides. A front fender 43 is provided to the front fork members 11. A rear fender 44 is provided to a rear end portion of the vehicle body frame F.

Steps 45 on which the driver places feet thereof are provided to lower portions of the pivot frames 15L and 15R. A main kickstand 46 is attached to the lower cross member 23.

The engine 10 can be a water-cooled parallel two-cylinder engine. The engine 10 can include a crankcase portion 51 that supports a crankshaft 50 extending in the vehicle width direction, and a cylinder portion 52 that extends upward from a top surface of a front portion of the crankcase portion 51.

The cylinder portion 52 can include, in order from the crankcase portion 51 side, a cylinder block 53 in which a piston (not shown) is housed, a cylinder head 54, and a cylinder head cover 55. The cylinder block 53 includes two cylinders arranged side by side in the vehicle width direction. The engine 10 is an engine in which a cylinder axis C of the cylinder block 53 slightly leans forward with respect to a vertical direction. The cylinder axis C leans forward more than the down frame 16.

A transmission is included in a rear portion of the crankcase portion 51. An output shaft 56 of the transmission protrudes outward to the left from the rear portion of the crankcase portion 51. A drive sprocket 57 is fixed to a shaft end of the output shaft 56. The output of the engine 10 is transmitted to the rear wheel 3 by a drive chain 59 wound between the drive sprocket 57 and a driven sprocket 58 of the rear wheel 3.

An intake device (not shown) of the engine 10 is disposed between the engine 10 and the fuel tank 37. Exhaust pipes 60 are drawn out forwardly downward from exhaust ports in front surfaces of the respective cylinders of the cylinder head 54, thereafter bend to the right side, pass the outside of a lower portion of a right side portion of the engine 10, and then extend rearward. Rear portions of the exhaust pipes 60 merge into one exhaust pipe. A rear end of the exhaust pipe is connected to a muffler 61 disposed on the right side of the rear wheel 3. The muffler 61 is disposed rearwardly upward. An exhaust outlet 61a at a rear end of the muffler 61 is located above a top surface of the rear wheel 3. An upper portion of the muffler 61 is supported by the sub-frame 19R on the right side.

The motorcycle 1 is set so as to be suitable for driving on rough terrain. Specifically, the position of an undersurface of the vehicle body (undersurface of the link member 34) with reference to an undersurface of the rear wheel 3 in a state of the motorcycle 1 being held upright by the main kickstand 46 is higher than one third of the vertical length of the rear wheel 3. The motorcycle 1 therefore has a high ground clearance, thus providing high traveling performance on rough terrain. In addition, an upper end of the front screen 40 is higher than a rearview mirror 62. The motorcycle 1 can therefore travel on rough terrain at a high speed. Further, the exhaust outlet 61a of the muffler 61 is at a high position. The motorcycle 1 therefore provides high traveling performance, for example, on wet surfaces and through puddles.

Figure 4:
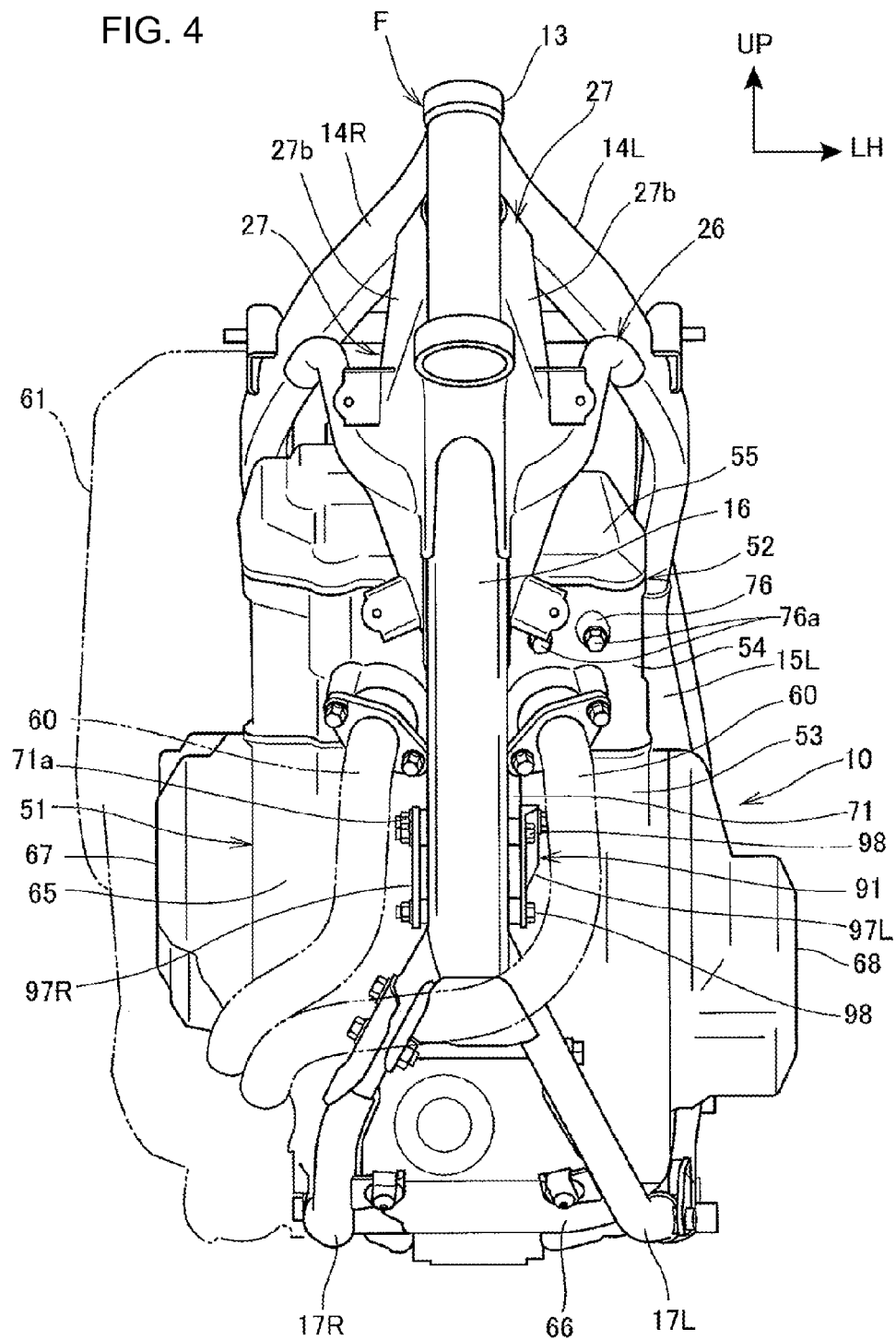
FIG. 4 is a front view of a vehicle body frame and an engine as viewed from a front side.
Figure 5:
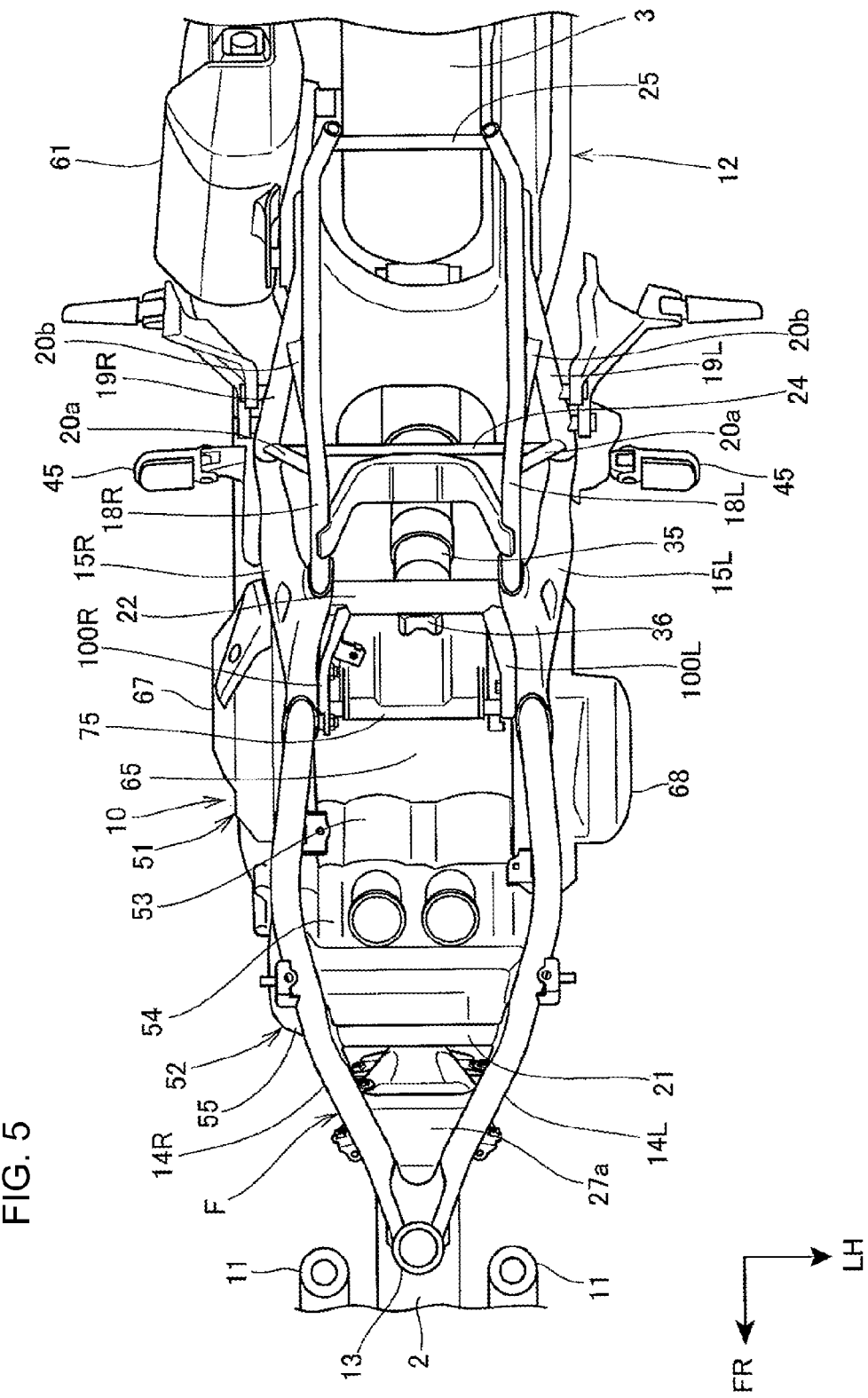
FIG. 5 is a view of a vehicle body viewed from above in an axial direction of a head pipe in the state of FIG. 2.

FIG. 4 is a front view of the vehicle body frame F and the engine 10 as viewed from the front side. FIG. 5 is a view of the vehicle body as viewed from above in an axial direction of the head pipe 13 in the state of FIG. 2. FIG. 4 does not show a cylinder portion hanger portion 96 to be described later.

As shown in FIGS. 3 to 5, the crankcase portion 51 includes a case main body 65 in the shape of a case that supports the crankshaft 50, and an oil pan 66 that is coupled to an undersurface of the case main body 65 and swells downward. A one-side side surface cover 67 is coupled to a right side surface of the case main body 65 and covers a clutch and the like (not shown) of the engine 10. An other-side side surface cover 68 is coupled to a left side surface of the case main body 65 and covers a generator and the like (not shown) of the engine 10. The one-side side surface cover 67 and the other-side side surface cover 68 swell out outward of the main frames 14L and 14R in the vehicle width direction as viewed from above.

The exhaust pipes 60 are each drawn out downward from a front surface of the cylinder head 54 on both of the left and right sides of the down frame 16.

The engine 10 can be an engine having a large displacement for a motorcycle. The engine 10 is therefore supported by the vehicle body frame F at fixed portions at a plurality of positions (six positions in the present first embodiment) that are more than three positions. Specifically, the engine 10 has a front upper fixed portion 71 that protrudes frontward from an upper portion of a front surface of the case main body 65, a front lower fixed portion 72 that protrudes frontward from a lower portion of the front surface of the case main body 65, and a rear intermediate fixed portion 73 that protrudes rearward from a vertically intermediate portion of a rear surface of the case main body 65. Further, the engine 10 has a rear lower fixed portion 74 that protrudes rearward from a lower portion of the rear surface of the case main body 65, a rear upper fixed portion 75 that protrudes upward from a top surface of a rear portion of the case main body 65, and a cylinder portion fixed portion 76 that protrudes frontward from the front surface of the cylinder head 54.

The front upper fixed portion 71, the front lower fixed portion 72, the rear lower fixed portion 74, and the rear upper fixed portion 75 have a hole that penetrates the engine 10 in the vehicle width direction, and are fastened to the vehicle body frame F by bolts 71a, 72a, 74a, and 75a that are inserted into the respective holes. The rear intermediate fixed portion 73 has a hole that penetrates the engine 10 in the vehicle width direction, and is fastened to the vehicle body frame F by the pivot shaft 32 inserted into this hole. That is, the pivot shaft 32 is a shaft that swingably supports the swing arm 12, and is also a bolt that fixes the engine 10. Nuts corresponding to the bolts 71a, 72a, 74a, and 75a and the pivot shaft 32, respectively, are fastened to axial ends of the bolts 71a, 72a, 74a, and 75a and the pivot shaft 32.

In addition, the cylinder portion fixed portion 76 is fastened to the vehicle body frame F by bolts 76a (FIG. 4) that are fastened from the front so as to be substantially orthogonal to the cylinder axis C.

As shown in FIG. 2 and FIG. 3, as viewed from the side, the vehicle body frame F has frame bodies 80L and 80R demarcated by the head pipe 13, the main frames 14L and 14R, the pivot frames 15L and 15R, the lower frames 17L and 17R, and the down frame 16. The engine 10 is disposed between the frame bodies 80L and 80R in the vehicle width direction, and disposed in a space inside the frame bodies 80L and 80R as viewed from the side. An upper portion on the front side of the frame bodies 80L and 80R in which upper portion the cylinder portion 52 is disposed protrudes upward so as to correspond to the external shape of the engine 10 as viewed from the side.

Figure 6:
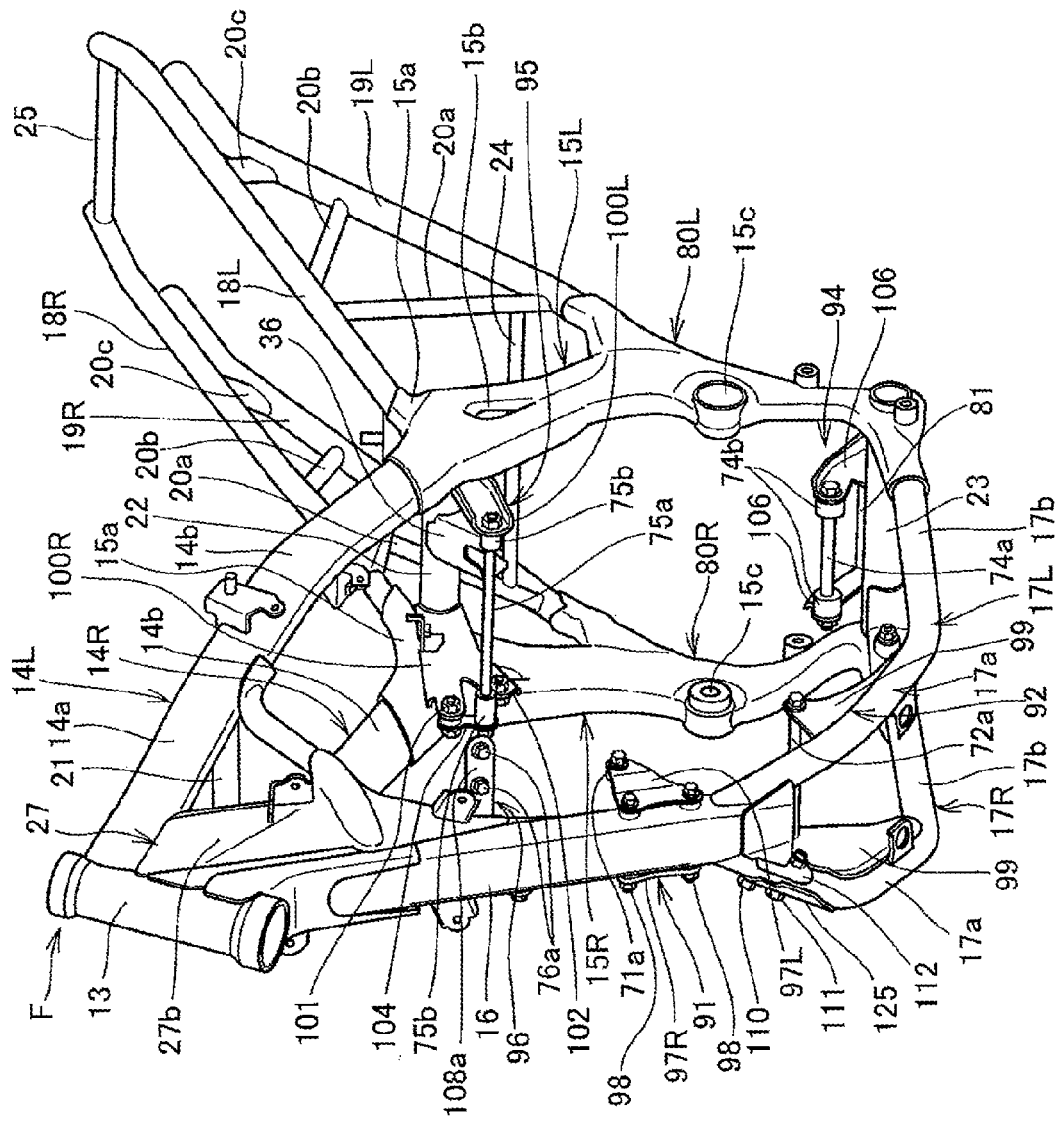
FIG. 6 is a perspective view of the vehicle body frame as viewed from a left front side.
Figure 7:
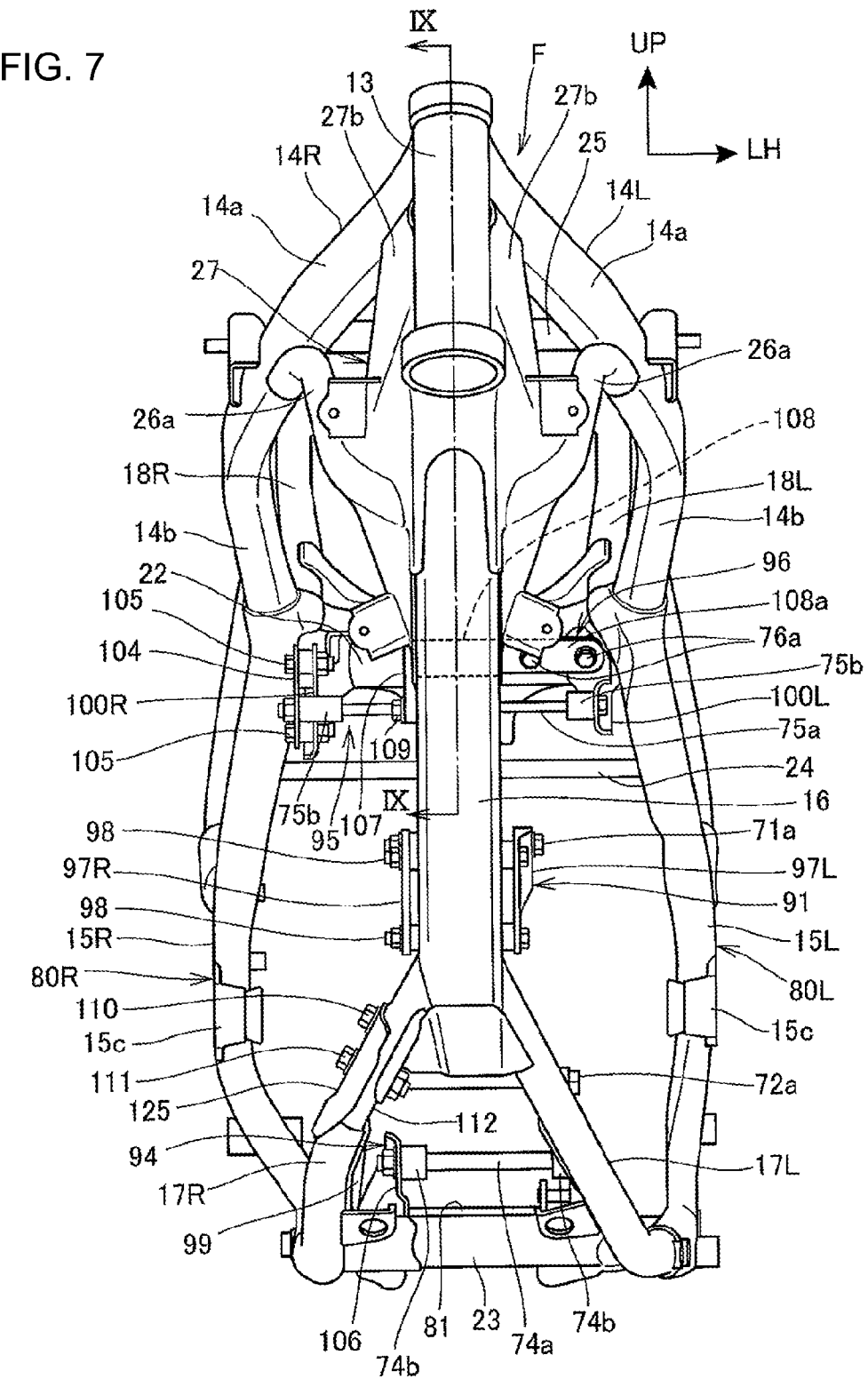
FIG. 7 is a front view of the vehicle body frame.
Figure 8:
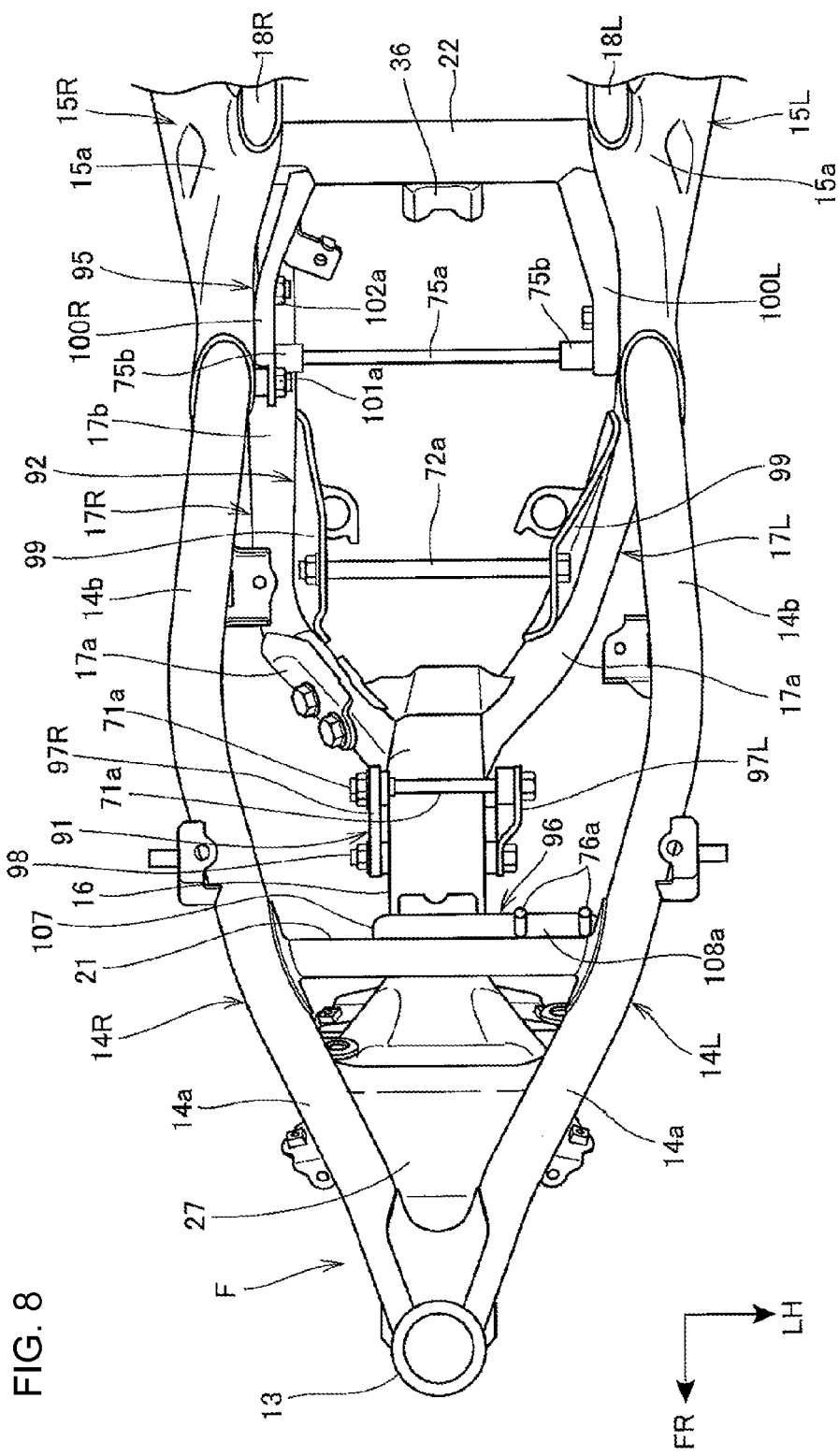
FIG. 8 is a view of the vehicle body frame as viewed from above in the axial direction of the head pipe.
Figure 9:
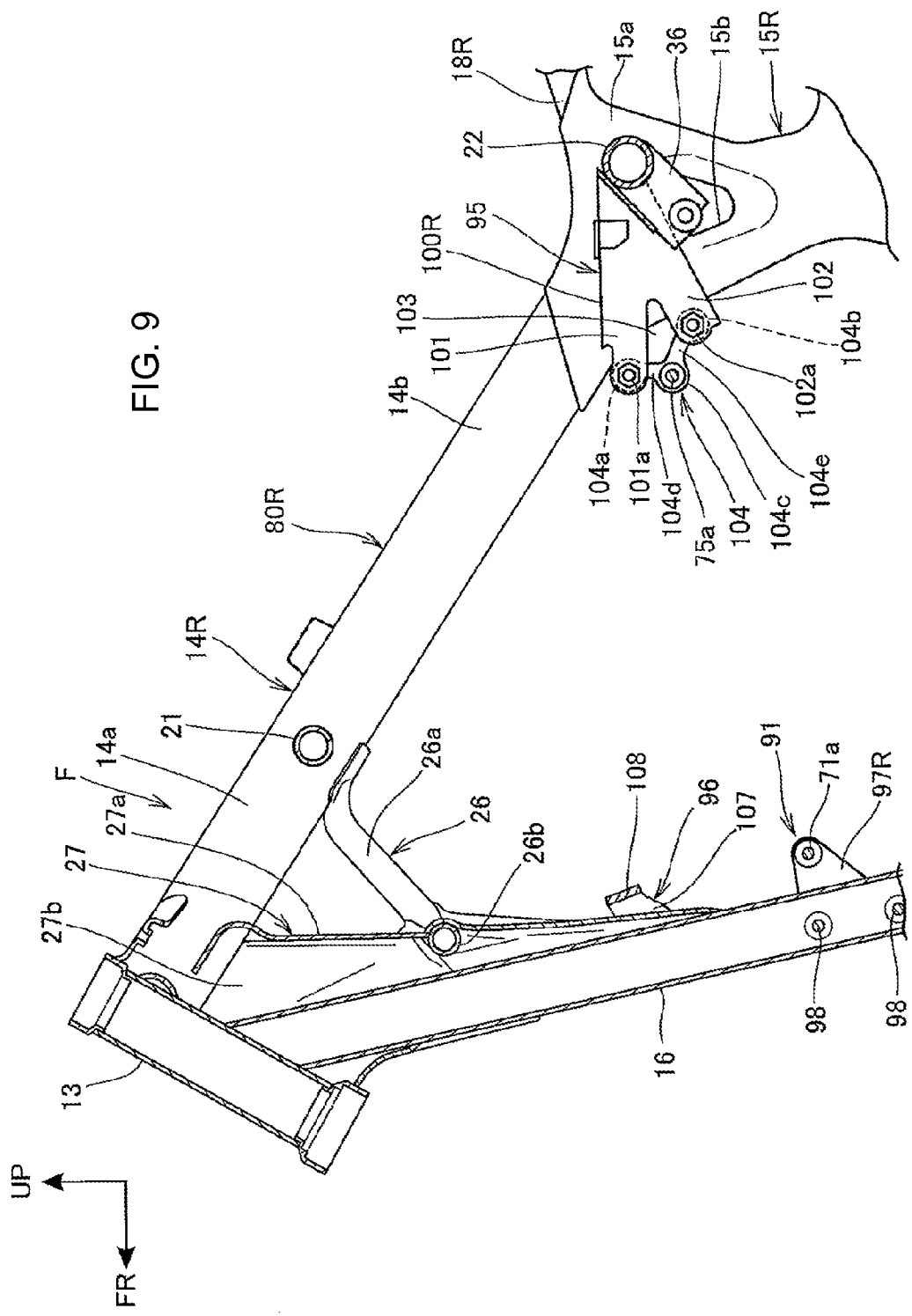
FIG. 9 is a sectional view taken along a line IX-IX of FIG. 7.

FIG. 6 is a perspective view of the vehicle body frame F as viewed from the left front side. FIG. 7 is a front view of the vehicle body frame F. FIG. 8 is a view of the vehicle body frame F as viewed from above in the axial direction of the head pipe 13. FIG. 9 is a sectional view taken along a line IX-IX of FIG. 7.

The vehicle body frame F is formed by coupling pipe members and plate members formed of steel materials to each other by welding and fastening. Incidentally, part or the whole of the vehicle body frame F may be formed of an aluminum alloy.

Referring to FIG. 3 and FIGS. 6 to 9, the main frames 14L and 14R respectively include front portions 14a that extend from an upper portion of a rear surface of the head pipe 13 and have an interval therebetween in the vehicle width direction such that the interval is increased toward the rear side. Rear portions 14b extend from rear ends of the front portions 14a, have an interval therebetween in the vehicle width direction such that the interval is decreased toward the rear side, and have rear ends connected to upper portions of the pivot frames 15L and 15R. The main frames 14L and 14R are each an elliptic pipe member that has a vertically long cross section in the axial direction.

The pivot frames 15L and 15R are each a plate-shaped member such that the size in the vehicle width direction of the pivot frames 15L and 15R is smaller than the size in a forward-rearward direction of the pivot frames 15L and 15R. The pivot frames 15L and 15R are formed such that the upper portions of the pivot frames 15L and 15R are wider than the lower portions of the pivot frames 15L and 15R as viewed from the side. The pivot frames 15L and 15R each include a rear extending portion 15a that extends rearwardly upward of a suspension coupling bolt 35a (FIG. 3), which couples an upper end portion of the rear suspension 35 to the suspension stay 36. The upper cross member 22 is connected to the rear extending portions 15a. In addition, front ends of the seat frames 18L and 18R are connected into the rear extending portions 15a in the rear of the upper cross member 22. The upper portions of the pivot frames 15L and 15R are each provided with a window portion 15b that exposes the suspension coupling bolt 35a to the outside.

The pivot frames 15L and 15R each have a pivot supporting hole portion 15c into which the pivot shaft 32 is inserted. The pivot supporting hole portions 15c are provided on a front edge side in lower parts of the vertically intermediate portions of the pivot frames 15L and 15R. In addition, the pivot supporting hole portions 15c are located below connecting portions connecting front ends of the sub-frames 19L and 19R to the pivot frames 15L and 15R.

The front end portion of the swing arm 12 is disposed so as to sandwich the rear intermediate fixed portion 73 of the case main body 65 from both outsides in the vehicle width direction. Further, the pivot supporting hole portions 15c are disposed so as to sandwich the front end portion of the swing arm 12 from both outsides in the vehicle width direction.

The lower ends of the pivot frames 15L and 15R are coupled to each other in the vehicle width direction by the lower cross member 23. The lower cross member 23 is located in the rear of the pivot shaft 32 and in front of the upper cross member 22. A link member connecting portion 81 (link rod supporting portion) protruding rearward is provided to a rear surface of the lower cross member 23. The link member connecting portion 81 and the upper cross member 22 are provided at substantially the same position in the forward-rearward direction.

The link member 34 includes a triangular link 34a that connects the swing arm 12 and the lower end of the rear suspension 35 to each other and a pair of left and right rod members 34b that couple the triangular link 34a and the link member connecting portion 81 to each other. Front ends of the rod members 34b are coupled to the link member connecting portion 81 by a rod coupling bolt 81a that penetrates the link member connecting portion 81 in the vehicle width direction.

The down frame 16 is a pipe member having a rectangular cross section which pipe member singly extends downward from a lower portion of the rear surface of the head pipe 13.

The lower frames 17L and 17R respectively include rearwardly downward extending portions 17a that extend rearwardly downward from a lower end portion of the down frame 16 and have an interval therebetween in the vehicle width direction such that the interval is increased toward the rear side, and horizontal portions 17b that extend horizontally rearward from rear ends of the rearwardly downward extending portions 17a and are connected to the lower ends of the pivot frames 15L and 15R. The lower frames 17L and 17R are each a pipe member having a substantially circular cross section. The cross-sectional area in the axial direction of each of the lower frames 17L and 17R is smaller than the cross-sectional area in the axial direction of each of the main frames 14L and 14R, the down frame 16, and the pivot frames 15L and 15R.

The vehicle body frame F is provided with a front upper hanger portion 91 (front hanger, high-rigidity hanger) that supports the front upper fixed portion 71 of the engine 10, a front lower hanger portion (front hanger, high-rigidity hanger) that supports the front lower fixed portion 72, and the pivot supporting hole portion 15c that supports the rear intermediate fixed portion 73. The pivot supporting hole portion 15c is a rear hanger portion (rear hanger, high-rigidity hanger) that supports a rear portion of the engine 10.

In addition, the vehicle body frame F is provided with a rear lower hanger portion 94 (third low-rigidity hanger) that supports the rear lower fixed portion 74, a rear upper hanger portion 95 (second low-rigidity hanger) that supports the rear upper fixed portion 75, and the cylinder portion hanger portion 96 (first low-rigidity hanger) that supports the cylinder portion fixed portion 76.

Specifically, the front upper hanger portion 91, the front lower hanger portion 92, and the pivot supporting hole portion 15c are each a high-rigidity hanger that supports the engine 10 in the vehicle body frame F with high rigidity. On the other hand, the rear lower hanger portion 94, the rear upper hanger portion 95, and the cylinder portion hanger portion 96 are each a low-rigidity hanger that supports the engine 10 in the vehicle body frame F with lower rigidity than that of the high-rigidity hangers.

The front upper hanger portion 91 is provided to a lower portion of the down frame 16. The front upper hanger portion 91 includes a pair of left and right hanger plates 97L and 97R fixed to both side surfaces in the vehicle width direction of the down frame 16, and a pair of hanger fixing bolts 98 that fix the hanger plates 97L and 97R to the down frame 16. Each of the hanger plates 97L and 97R is formed in substantially the shape of a vertically long triangle as viewed from the side. The hanger fixing bolts 98 are inserted into two vertex portions of the triangle. The hanger plates 97L and 97R are thereby fastened to the down frame 16. The hanger plates 97L and 97R are fixed such that the one remaining vertex portion of the triangle protrudes to the inside of the frame bodies 80L and 80R as viewed from the side. The bolt 71a is inserted into the protruding part.

The front upper fixed portion 71 of the case main body 65 is disposed between the hanger plates 97L and 97R, and is fixed between the hanger plates 97L and 97R by fastening the bolt 71a. The hanger plate 97R on the right side is a flat plate, whereas the hanger plate 97L on the left side is increased in rigidity by being bent stepwise such that a rear end portion of the hanger plate 97L is located outward of a front end portion of the hanger plate 97L in the vehicle width direction.

That is, in the front upper hanger portion 91, the hanger plates 97L and 97R have a short longitudinal length, the front upper fixed portion 71 is sandwiched from the left and the right by the hanger plates 97L and 97R, and further the bent shape increases rigidity. Thus, the front upper fixed portion 71 can be supported with high rigidity.

The front lower hanger portion 92 is provided to the rearwardly downward extending portions 17a of the lower frames 17L and 17R. The front lower hanger portion includes a pair of left and right hanger plates 99 that extend upward from the rearwardly downward extending portions 17a, respectively. The hanger plates 99 are formed in substantially the shape of a triangle as viewed from the side. Lower edge portions (base portions) of the hanger plates 99 are welded to inside surfaces of upper portions of the rearwardly downward extending portions 17a. Upper end portions of the hanger plates 99 are fixed so as to protrude to the inside of the frame bodies 80L and 80R as viewed from the side. The bolt 72a is inserted into the upper end portions. The hanger plates 99 are bent such that the upper end portions of the hanger plates 99 are located more inward in the vehicle width direction than lower edge portions of the hanger plates 99. The bent shape increases rigidity.

The front lower fixed portion 72 of the case main body 65 is disposed between the hanger plates 99, and is fixed between the hanger plates 99 by fastening the bolt 72a.

That is, in the front lower hanger portion 92, the hanger plates 99 have a short vertical length, the front lower fixed portion 72 is sandwiched from the left and the right by the hanger plates 99, and further the bent shape increases rigidity. Thus, the front lower fixed portion 72 can be supported with high rigidity.

The pivot supporting hole portions 15c as rear hanger portions are each formed integrally as part of the pivot frames 15L and 15R, and are formed with high rigidity to support the swing arm 12 and the engine 10.

The rear intermediate fixed portion 73 of the case main body 65 is disposed between the pivot supporting hole portions 15c, and is fixed between the pivot supporting hole portions 15c by fastening the pivot shaft 32.

The rear upper hanger portion 95 includes a pair of left and right hanger arms 100L and 100R that extend frontward from the upper cross member 22. The hanger arms 100L and 100R are each a plate-shaped member provided with a plate thickness direction of the hanger arms 100L and 100R substantially coinciding with the vehicle width direction, and are formed so as to be longer in the forward-rearward direction than in an upward-downward direction. Rear ends of the hanger arms 100L and 100R are welded to a front surface of the upper cross member 22, and the hanger arms 100L and 100R extend frontward in an attitude of being slightly tilted forwardly downward. The hanger arms 100L and 100R are provided to the upper cross member 22 with the plates of the hanger arms 100L and 100R in a vertical state. Therefore, the hanger arms 100L and 100R have a high rigidity in the upward-downward direction, and have a lower rigidity in the vehicle width direction than the rigidity in the upward-downward direction.

The hanger arm 100L on the left side is disposed between the suspension stay 36 and the pivot frame 15L on the left side, and is provided so as to be separated from the pivot frame 15L in the vehicle width direction. The hanger arm 100R on the right side is disposed between the suspension stay 36 and the pivot frame 15R on the right side, and is provided so as to be separated from the pivot frame 15R in the vehicle width direction.

The hanger arm 100L on the left side has, in a front end portion thereof, a hole (not shown) into which the bolt 75a is inserted.

As shown in FIG. 9, the hanger arm 100R on the right side branches vertically from a longitudinally intermediate portion, and then extends frontward. The hanger arm 100R on the right side includes an upper arm portion 101 that extends forward straight along an upper edge of a base end portion of the hanger arm 100R and a lower arm portion 102 that extends so as to be tilted forwardly downward more than the upper arm portion 101. A notch portion 103 is formed between the upper arm portion 101 and the lower arm portion 102. Because the notch portion 103 is formed, the rigidity of the hanger arm 100R on the right side is set moderately low.

Front end portions of the upper arm portion 101 and the lower arm portion 102 are positioned in the space inside the frame bodies 80L and 80R as viewed from the side in FIG. 3. Nut portions 101a and 102a are respectively provided to inside surfaces of the front end portions. The nut portion 102a of the lower arm portion 102 is located rearward and downward of the nut portion 101a of the upper arm portion 101.

A supporting plate 104 into which the bolt 75a is inserted is attached to the front end portions of the upper arm portion 101 and the lower arm portion 102 of the hanger arm 100R on the right side. As viewed from the side, the supporting plate 104 is formed in substantially the shape of an L that couples the front end portions of the upper arm portion 101 and the lower arm portion 102 to each other.

Specifically, the supporting plate 104 includes an upper coupling portion 104a coupled to the upper arm portion 101, a lower coupling portion 104b coupled to the lower arm portion 102, and a bolt coupling portion 104c to which the bolt 75a is coupled. A plate portion 104d connects the bolt coupling portion 104c and the upper coupling portion 104a to each other, and a plate portion 104e connects the bolt coupling portion 104c and the lower coupling portion 104b to each other. The bolt coupling portion 104c is formed as an L-shaped bent portion. As viewed from the side, the plate portions 104d and 104e are formed so as to be narrower than the upper coupling portion 104a, the lower coupling portion 104b, and the bolt coupling portion 104c. In addition, the width of the plate portions 104d and 104e as viewed from the side is smaller than the width of the upper arm portion 101 and the lower arm portion 102. Therefore, the rigidity of the plate portions 104d and 104e is reduced, so that the supporting plate 104 can be elastically deformed moderately in the vehicle width direction.

The supporting plate 104 is disposed on outside surfaces of the front end portions of the upper arm portion 101 and the lower arm portion 102. The supporting plate 104 is fastened to the upper arm portion 101 and the lower arm portion 102 by supporting plate fixing bolts 105 inserted into the upper coupling portion 104a and the lower coupling portion 104b. The supporting plate fixing bolts 105 are screwed into the nut portions 101a and 102a.

The rear upper fixed portion 75 of the case main body 65 is disposed between the bolt coupling portion 104c of the supporting plate 104 and the hanger arm 100L on the left side, and is fixed between the hanger arms 100L and 100R by fastening the bolt 75a. Cylindrical collars 75b are interposed between the supporting plate 104 and the rear upper fixed portion 75 and between the hanger arm 100L and the rear upper fixed portion 75, respectively.

In the rear upper hanger portion 95, as viewed from the side, the hanger arms 100L and 100R extend from rear portions of the pivot frames 15L and 15R, which rear portions are in the rear of the suspension coupling bolt 35a, to the inside of the frame bodies 80L and 80R. The hanger arms 100L and 100R are thus longitudinally long. Therefore, the rigidity of the hanger arms 100L and 100R can be made moderately low. In addition, the hanger arm 100R on the right side has the notch portion 103, and part of the supporting plate 104 is the narrow plate portions 104d and 104e. The rigidity of the hanger arm 100R can therefore be adjusted to be moderately low.

As shown in FIG. 3, FIG. 6, and FIG. 7, the rear lower hanger portion 94 includes a pair of left and right lower hanger plates 106 that obliquely extend forwardly upward from an upper surface of the link member connecting portion 81. The lower hanger plates 106 are each a plate-shaped member provided with the plate thickness direction of the plate-shaped member substantially coinciding with the vehicle width direction, and are formed so as to be longer in the forward-rearward direction than in the upward-downward direction. The lower hanger plates 106 are provided to the link member connecting portion 81 with the plates of the lower hanger plates 106 in a vertical state. Therefore, the lower hanger plates 106 have a high rigidity in the upward-downward direction, and have a lower rigidity in the vehicle width direction than the rigidity in the upward-downward direction. The lower hanger plates 106 are provided so as to be separated inward in the vehicle width direction from inside surfaces of the pivot frames 15L and 15R, respectively.

Front end portions of the lower hanger plates 106 extend to the inside of the frame bodies 80L and 80R as viewed from the side in FIG. 3. The bolt 74a is inserted into the front end portions.

The rear lower fixed portion 74 of the case main body 65 is disposed between the front end portions of the lower hanger plates 106, and is fixed between the lower hanger plates 106 by fastening the bolt 74a. Cylindrical collars 74b are interposed between one of the lower hanger plates 106 and the rear lower fixed portion 74 and between the other of the lower hanger plates 106 and the rear lower fixed portion 74, respectively.

In the rear lower hanger portion 94, the lower hanger plates 106 extend from the link member connecting portion 81, longitudinally straddle the lower portions of the pivot frames 15L and 15R, and extend to the inside of the frame bodies 80L and 80R as viewed from the side. The lower hanger plates 106 are thus longitudinally long. Therefore, the rigidity of the rear lower hanger portion 94 can be made moderately low.

As shown in FIG. 3 and FIGS. 6 to 9, the cylinder portion hanger portion 96 is disposed above the front upper hanger portion 91 on the down frame 16. The cylinder portion hanger portion 96 is formed in substantially the shape of an L as viewed from above. The cylinder portion hanger portion 96 includes a fixed plate portion 107 that is fixed to a right side surface (one side surface) of the down frame 16 and extends rearward to the cylinder head 54 side, and a supporting plate portion 108 that bends inward in the vehicle width direction substantially at a right angle at a rear end of the fixed plate portion 107 and extends to a left side surface (another side surface) side of the down frame 16.

The supporting plate portion 108 extends in the vehicle width direction so as to straddle the down frame 16. That is, the supporting plate portion 108 includes a vehicle width direction extending portion 108a that extends in the vehicle width direction beyond the left side surface of the down frame 16 on the opposite side from the right side surface of the down frame 16 to which right side surface the fixed plate portion 107 is fixed.

The cylinder portion hanger portion 96 is fastened to the right side surface of the down frame 16 by a bolt 109 inserted into the fixed plate portion 107 in the vehicle width direction. In addition, the cylinder portion hanger portion 96 is fastened to the cylinder portion fixed portion 76 on the front surface of the cylinder head 54 by the bolts 76a inserted from the front into the vehicle width direction extending portion 108a of the supporting plate portion 108.

In the cylinder portion hanger portion 96, the one cylinder portion hanger portion 96 supports the cylinder head 54 in a cantilever manner. Therefore the rigidity of the cylinder portion hanger portion 96 can be made moderately low. In addition, the cylinder portion hanger portion 96 is fastened to the cylinder head 54 via the vehicle width direction extending portion 108a that straddles the down frame 16 in the vehicle width direction, so that the length of the cylinder portion hanger portion 96 is increased. Therefore the rigidity of the cylinder portion hanger portion 96 can be made moderately low.

The main frames 14L and 14R are not directly coupled to the engine 10, and do not have engine hangers.

As shown in FIG. 3, the front upper hanger portion 91, the front lower hanger portion 92, and the pivot supporting hole portion 15c as three high-rigidity hangers are provided to lower portions of the frame bodies 80L and 80R. The three high-rigidity hangers therefore ensure a high rigidity of the lower portions of the frame bodies 80L and 80R.

Upper portions of the frame bodies 80L and 80R, that is, a section between the front upper hanger portion 91 and the pivot supporting hole portion 15c on the frame bodies 80L and 80R is provided with the cylinder portion hanger portion 96 and the rear upper hanger portion 95 as low-rigidity hangers, but is not provided with high-rigidity hangers. Therefore, the cylinder portion hanger portion 96 and the rear upper hanger portion 95 having low rigidity can reinforce the supporting of the engine 10 and reduce the rigidity of the upper portions of the frame bodies 80L and 80R. Thus moderately reducing the rigidity of the frame bodies 80L and 80R can distribute a load from a road surface which load is input from the side of the front wheel 2 or the rear wheel 3 to the vehicle body frame F by elastic deformation of the frame bodies 80L and 80R, so that the riding comfort of the occupant can be improved. In particular, the main frames 14L and 14R that are longitudinally long and close to the occupant are not provided with engine hangers. Therefore the riding comfort can be improved effectively by making the main frames 14L and 14R elastically deformed moderately.

In addition, the cylinder portion hanger portion 96 having low rigidity is provided to the upper portion of the down frame 16. Thus, the upper portion of the down frame 16 can be elastically deformed moderately, and the cylinder portion 52 can be prevented from being shaken greatly. The cylinder portion hanger portion 96 is located in front of and above the front upper hanger portion 91 as viewed from the side.

In addition, the rear upper hanger portion 95 having low rigidity is provided to the upper cross member 22. Thus, a portion around the upper cross member 22 which portion includes the upper portions of the pivot frames 15L and 15R and the main frames 14L and 14R can be elastically deformed moderately. The rear upper hanger portion 95 is located between the front upper hanger portion 91 and the pivot supporting hole portion 15c as viewed from the side.

Further, the rear lower hanger portion 94 having low rigidity is disposed in a section between the front lower hanger portion 92 and the pivot supporting hole portion 15c on the frame bodies 80L and 80R. Therefore, the rear lower hanger portion 94 having low rigidity can reinforce the supporting of the engine 10 and moderately reduce the rigidity of the lower portions of the frame bodies 80L and 80R. The riding comfort of the occupant can thus be improved by making the frame bodies 80L and 80R elastically deformed moderately. In addition, the lower frames 17L and 17R that account for large part of the lower portions of the frame bodies 80L and 80R each have a smaller cross-sectional area than the cross-sectional area in the axial direction of each of the main frames 14L and 14R, the down frame 16, and the pivot frames 15L and 15R. The riding comfort of the occupant can thus be improved by making the lower portions of the frame bodies 80L and 80R moderately elastically deformed.

As shown in FIG. 3 and FIGS. 6 to 8, the lower frame 17R on the right side is detachably fixed to the vehicle body frame F by fastening a front end portion and a rear end portion of the lower frame 17R. Incidentally, of the frames constituting the frame bodies 80L and 80R, the frames other than the lower frame 17R are coupled to each other by welding.

In the present first embodiment, the lower frame 17R on the right side and the supporting plate 104 of the hanger arm 100R on the right side are fixed by fastening, and are thus detachable. It is therefore possible to mount the engine 10 into the frame bodies 80L and 80R from the right side, and thereafter assemble the lower frame 17R and the supporting plate 104. Good assembling workability is thus obtained.

The lower frame 17R is fastened to a front end connecting portion 112 provided to the lower end of the down frame 16 by a pair of frame fixing bolts 110 and 111 inserted into an outside surface of the front end portion of the lower frame 17R.

The lower frame 17R is fastened to a rear end connecting portion 115 provided to the lower end of the pivot frame 15R by a pair of frame fixing bolts 113 and 114 inserted into an outside surface of the rear end portion of the lower frame 17R.

Figure 10:
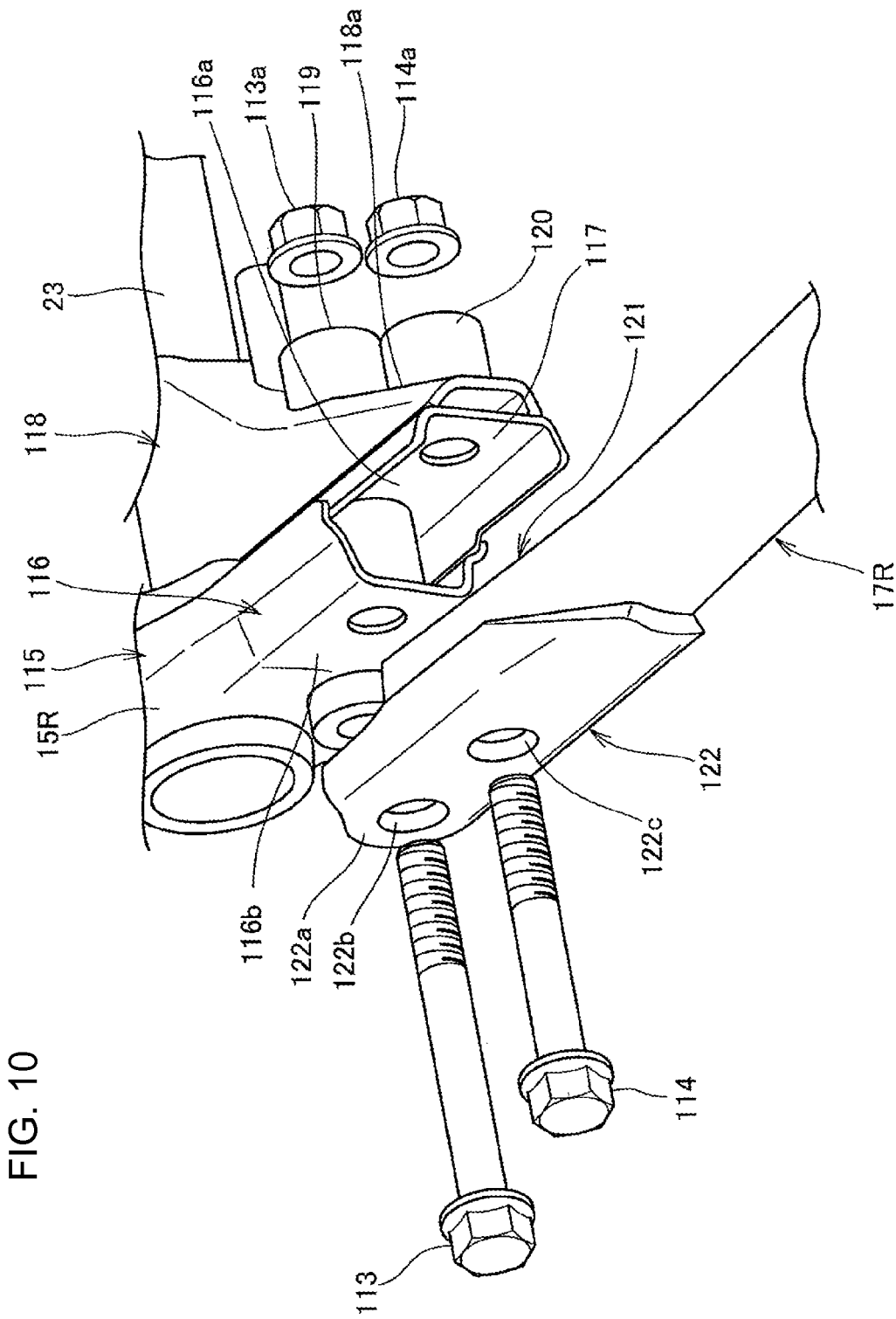
FIG. 10 is an exploded perspective view of a portion around a rear end portion of a lower frame on a right side.
Figure 11:
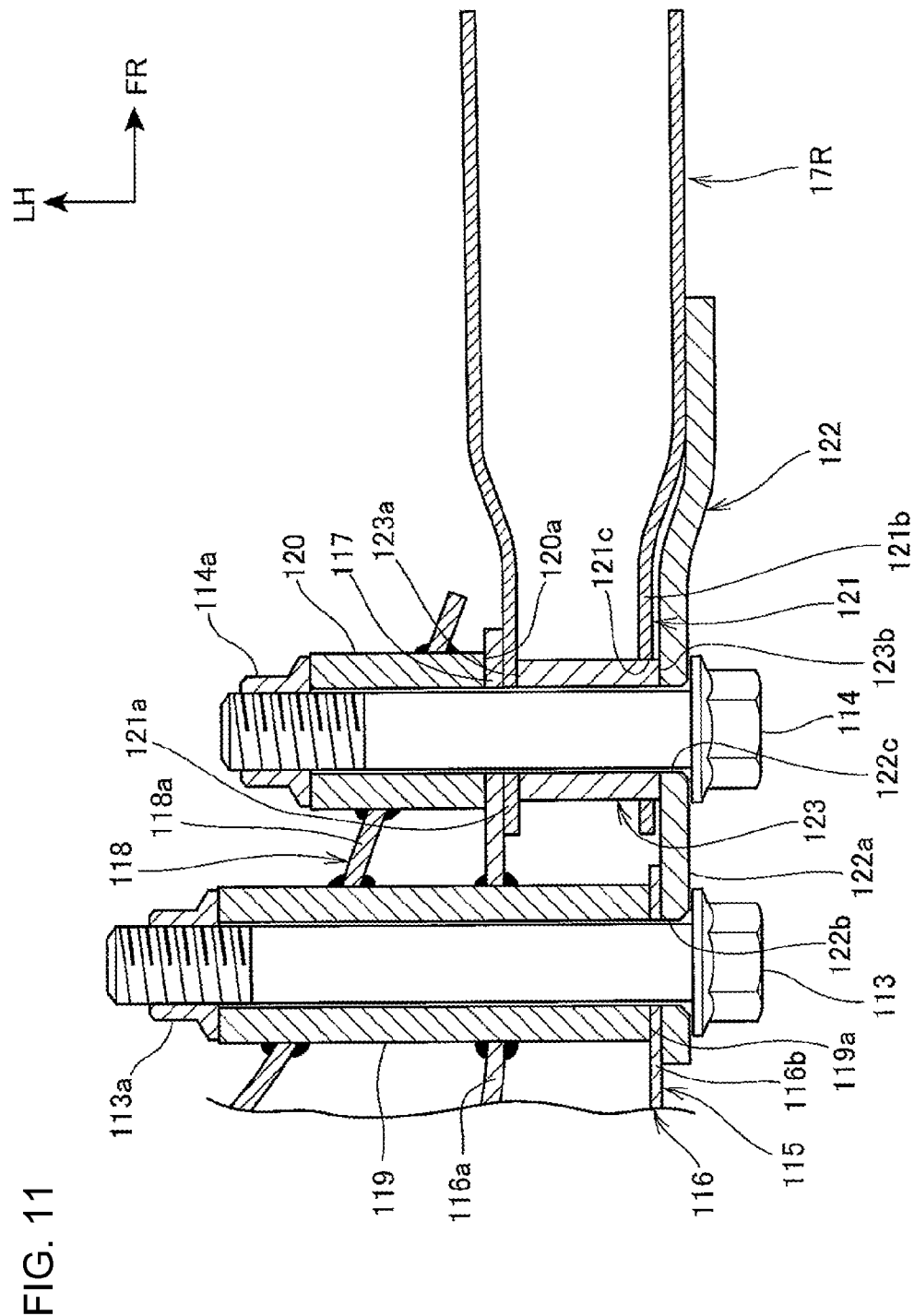
FIG. 11 is a sectional view taken along a line XI-XI of FIG. 3.

FIG. 10 is an exploded perspective view of a portion around the rear end portion of the lower frame 17R. FIG. 11 is a sectional view taken along a line XI-XI of FIG. 3.

The rear end connecting portion 115 of the pivot frame 15R includes a hollow pipe portion 116 that extends frontward from a front surface of the lower end of the pivot frame 15R, and an inside extending wall 117 formed by extending frontward an inside wall 116a in the vehicle width direction of the pipe portion 116.

The rear end connecting portion 115 is connected with a reinforcing member 118 provided so as to straddle a front surface of the lower cross member 23 and the inside wall 116a and the inside extending wall 117 of the rear end connecting portion 115.

The pipe portion 116 has a cylindrical collar 119 into which the frame fixing bolt 113 on the rear side is inserted. The inside extending wall 117 has a cylindrical collar 120 into which the frame fixing bolt 114 on the front side is inserted.

The collar 119 is provided so as to penetrate the inside wall 116a of the pipe portion 116 and a side wall 118a of the reinforcing member 118 in the vehicle width direction, and is welded at the penetrating portions to the inside wall 116a and the side wall 118a. An outer end 119a of the collar 119 is butted against an inner surface of an outside wall 116b in the vehicle width direction of the pipe portion 116. An inner end of the collar 119 is positioned inward of the side wall 118a of the reinforcing member 118 in the vehicle width direction. A nut 113a fastened to the frame fixing bolt 113 abuts against the inner end.

The collar 120 is provided so as to penetrate the side wall 118a of the reinforcing member 118 in the vehicle width direction, and is welded at the penetrating portion to the side wall 118a. An outer end 120a of the collar 120 is butted against an outer surface of the inside extending wall 117. An inner end of the collar 120 is positioned inward of the side wall 118a in the vehicle width direction. A nut 114a fastened to the frame fixing bolt 114 abuts against the inner end.

The rear end portion of the lower frame 17R includes a hollow pipe portion 121 that extends rearward, an outside plate member 122 fixed to an outer surface in the vehicle width direction of the pipe portion 121 by welding, and a cylindrical inside collar 123 housed within the pipe portion 121.

The outside plate member 122 includes an outside extending wall 122a that extends rearward of a rear end of the pipe portion 121. The outside extending wall 122a abuts against the outside wall 116b of the pipe portion 116 from the outside. An inside wall 121a in the vehicle width direction of the pipe portion 121 abuts against the inside extending wall 117 of the pipe portion 116 from the outside.

The frame fixing bolt 114 is inserted into the inside collar 123. An inner end 123a of the inside collar 123 is butted against an inner surface of the inside wall 121a of the pipe portion 121. An outer end 123b of the inside collar 123 penetrates a hole 121c of an outside wall 121b in the vehicle width direction of the pipe portion 121, and is butted against an inner surface of the outside plate member 122.

The frame fixing bolt 113 is inserted into the collar 119 through a hole 122b formed in the outside plate member 122, and is fixed by the nut 113a.

The frame fixing bolt 114 is inserted into the inside collar 123 and the collar 120 through a hole 122c formed in the outside plate member 122, and is fixed by the nut 114a.

In the present first embodiment, the outer end 123b of the inside collar 123 penetrates the pipe portion 121, and is butted against the outside plate member 122. Thus, the fastening axial force of the frame fixing bolt 114 is received by the inside collar 123, and the outside wall 121b of the pipe portion 121 is not crushed by the axial force of the frame fixing bolt 114. Therefore, the lower frame 17R can be fixed to the pivot frame 15R accurately and securely.

In addition, as shown in FIG. 3, the front end portion of the lower frame 17R is fastened to the front end connecting portion 112 of the down frame 16 by a structure similar to that of the rear end portion. Specifically, an outer end of an inside collar (not shown) housed inside the pipe-shaped front end portion of the lower frame 17R is butted from the inside against an outside plate member 125 fixed to the lower frame 17R, and the axial force of the frame fixing bolt 111 is received by the inside collar. Therefore, an outside wall of the front end portion of the lower frame 17R can be prevented from being crushed by the fastening axial force.

As described above, according to the first embodiment to which the present invention is applied, an engine supporting structure for a motorcycle 1 includes a vehicle body frame F including frame bodies 80L and 80R formed, as viewed from a side, by a head pipe 13, a pair of left and right main frames 14L and 14R extending rearward from the head pipe 13. A pair of left and right pivot frames 15L and 15R extend downward from rear portions of the main frames 14L and 14R, and a down frame 16 extends downward from the head pipe 13. A pair of left and right lower frames 17L and 17R extend rearward from a lower end of the down frame 16 and connected to lower ends of the pair of left and right pivot frames 15L and 15R. The left and right pivot frames 15L and 15R are coupled to each other by an upper cross member 22 and a lower cross member 23. An engine 10 includes a crankcase portion 51 supporting a crankshaft 50 and a cylinder portion 52 extending upward from the crankcase portion 51. The engine 10 is supported in a lower portion of the vehicle body frame F by a front upper hanger portion 91 and a front lower hanger portion 92. A front hanger is provided to the down frame 16 and the lower frames 17L and 17R to support a front portion of the crankcase portion 51. A pivot supporting hole portion 15c as a rear hanger provided to the pivot frames 15L and 15R to support a rear portion of the crankcase portion 51. The front upper hanger portion 91, the front lower hanger portion 92, and the pivot supporting hole portion 15c are high-rigidity hangers having high rigidity. The engine 10 is supported in the vehicle body frame F by a cylinder portion hanger portion 96 and a rear upper hanger portion as a low-rigidity hanger provided between the front upper hanger portion 91 and the pivot supporting hole portion 15c along the frame bodies 80L and 80R of the vehicle body frame F. A rear lower hanger portion 94 is provided as a low-rigidity hanger between the front lower hanger portion 92 and the pivot supporting hole portion 15c along the frame bodies 80L and 80R. The front upper hanger portion 91, the front lower hanger portion 92, and the pivot supporting hole portion 15c as high-rigidity hangers thus support the crankcase portion 51 in the lower portion of the vehicle body frame F. Therefore, the rigidity of the lower portions of the frame bodies 80L and 80R of the vehicle body frame F can be increased effectively by the crankcase portion 51, and the crankcase portion 51 can be supported well. Parts between the high-rigidity hangers in the frame bodies 80L and 80R support the engine 10 via the low-rigidity hangers. Thus, the vehicle body frame F can be elastically deformed moderately at the parts of the low-rigidity hangers while the engine 10 is supported by the low-rigidity hangers. The riding comfort of an occupant can therefore be improved by making the vehicle body frame F elastically deformed moderately in response to a load from the outside.

In addition, the front hanger includes the front upper hanger portion 91 provided to the down frame to support a front upper portion of the crankcase portion 51. The front lower hanger portion 92 is provided to the lower frames 17L and 17R to support a front lower portion of the crankcase portion 51, and the high-rigidity hangers are formed by three pieces including the front upper hanger portion 91, the front lower hanger portion 92, and the pivot supporting hole portion 15c. The cylinder portion hanger portion 96 is provided as a first low-rigidity hanger that is disposed on the down frame 16 in a section between the front upper hanger portion 91 and the pivot supporting hole portion 15c as viewed from the side to support a front portion of the cylinder portion 52. Thus, the crankcase portion 51 can be supported well by the three pieces of the high-rigidity hangers. In addition, because the cylinder portion hanger portion 96 having low rigidity which cylinder portion hanger portion is disposed on the down frame 16 between the high-rigidity hangers (the front upper hanger portion 91 and the pivot supporting hole portion 15c) supports the cylinder portion 52, the down frame 16 can be elastically deformed moderately while the cylinder portion 52 is prevented from being shaken greatly.

In addition, the rear upper hanger portion 95 is provided as a second low-rigidity hanger that is disposed on the upper cross member 22 coupling upper portions of the left and right pivot frames 15L and 15R to each other in a section between the front upper hanger portion 91 and the pivot supporting hole portion 15c as viewed from the side, and which supports an upper portion of the crankcase portion 51. Therefore, the upper portion of the crankcase portion 51 is supported by the rear upper hanger portion 95 of the upper cross member 22, and the main frames 14L and 14R do not need to support the upper portion of the crankcase portion 51. Thus, the main frames 14L and 14R can be moderately elastically deformed. In addition, the rear upper hanger portion 95 can reinforce the supporting of the crankcase portion 51, and make the rigidity of a portion around the upper portions of the pivot frames 15L and 15R moderately high. Therefore, the riding comfort of the occupant can be improved.

Further, the main frames 14L and 14R extend rearward while bending leftwardly outward and rightwardly outward, respectively, from the head pipe 13, and the main frames 14L and 14R are not provided with an engine hanger for supporting the engine 10. Therefore, the main frames 14L and 14R, which are allowed by the bent shape to be moderately elastically deformed, can be bent effectively without being restricted by the engine 10. The riding comfort of the occupant can thus be improved.

In addition, the pivot frames 15L and 15R include the lower cross member 23 coupling lower portions of the left and right pivot frames 15L and 15R to each other. The pivot frames 15L and 15R also include a link member connecting portion 81 supporting a swing arm 12 in rear of the lower cross member 23. The rear lower hanger portion 94 is provided as a third low-rigidity hanger that is disposed between the front lower hanger portion and the pivot supporting hole portion 15c as viewed from the side so as to be supported by the link member connecting portion 81 and so as to straddle the lower cross member 23, and which supports the lower portion of the crankcase portion 51. The lower portion of the crankcase portion 51 is thereby supported by the longitudinally long rear lower hanger portion 94 that straddles the lower cross member 23 from the link member connecting portion 81 in the rear of the lower cross member 23 and which supports the lower portion of the crankcase portion 51. Thus, the rear lower hanger portion 94 can reinforce the supporting of the crankcase portion 51, and make the rigidity of a portion around the lower portions of the pivot frames 15L and 15R moderately high. The riding comfort of the occupant can therefore be improved.

In addition, the lower frames 17L and 17R are each a pipe-shaped frame having a smaller cross-sectional area than each of the main frames 14L and 14R, the down frame 16, and the pivot frames 15L and 15R. Thus, the lower frames 17L and 17R can be moderately elastically deformed. The riding comfort of the occupant can therefore be improved.

A second embodiment to which the present invention can be applied will be described in the following with reference to FIG. 12. In this second embodiment, parts formed in a similar manner to those of the first embodiment are identified by the same reference symbols, and description thereof will be omitted.

The shape of a supporting plate 204 that is fixed to a hanger arm 100R to support a rear upper fixed portion 75 in the second embodiment is different from the supporting plate 104 in the first embodiment.

Figure 12:
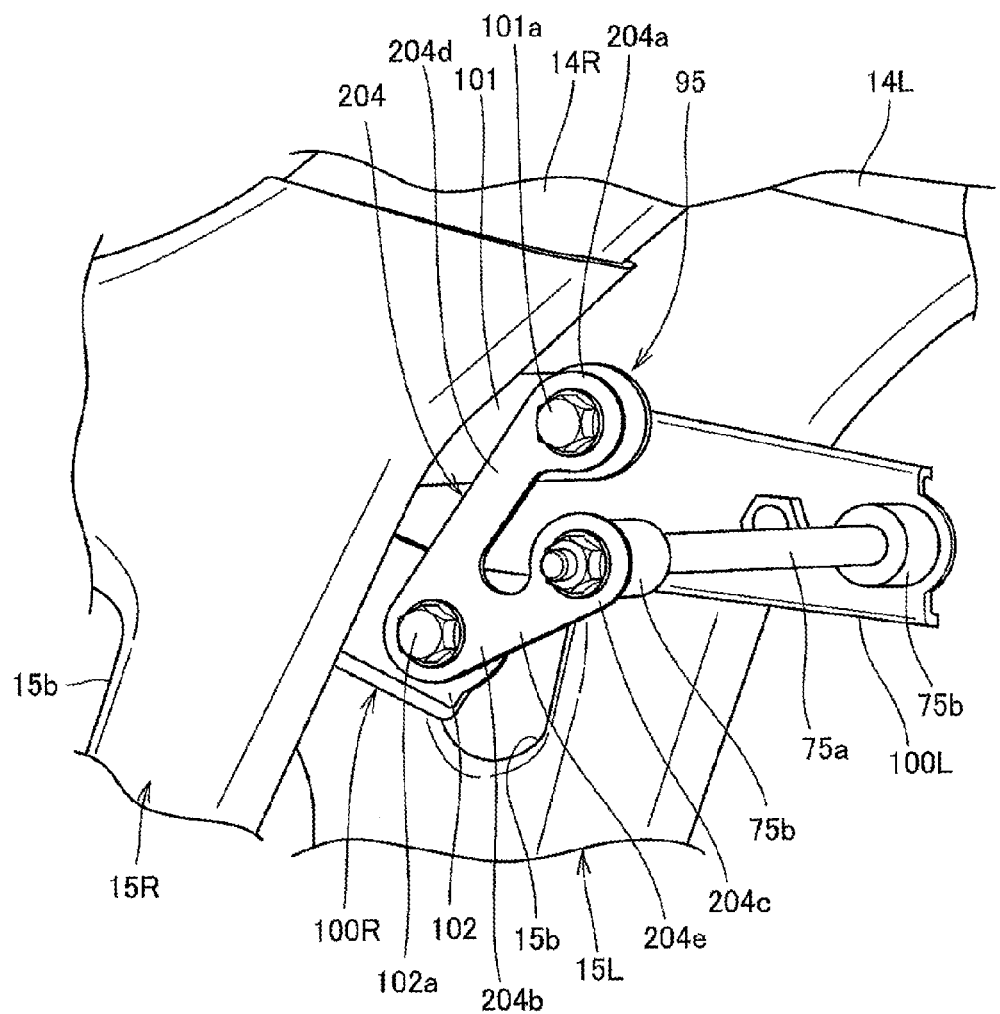
FIG. 12 is a perspective view showing a structure of a portion around a hanger arm in a second embodiment.

FIG. 12 is a perspective view showing a structure of a portion around the hanger arm 100R in the second embodiment.

The supporting plate 204 includes an upper coupling portion 204a coupled to an upper arm portion 101, a lower coupling portion 204b coupled to a lower arm portion 102, a bolt coupling portion 204c to which a bolt 75a is coupled, a plate portion 204d that connects the upper coupling portion 204a and the lower coupling portion 204b to each other, and a plate portion 204e that connects the lower coupling portion 204b and the bolt coupling portion 204c to each other.

As viewed from the side, the plate portions 204d and 204e are formed so as to be narrower than the upper coupling portion 204a, the lower coupling portion 204b, and the bolt coupling portion 204c. In addition, the width of the plate portions 204d and 204e, as viewed from the side, is smaller than the width of the upper arm portion 101 and the lower arm portion 102. Therefore, the rigidity of the plate portions 204d and 204e can be reduced, so that the supporting plate 204 can be moderately elastically deformed in the vehicle width direction. In addition, the bolt coupling portion 204c is essentially supported by one plate portion 204e with a front end portion of the lower arm portion 102 as a fulcrum. Therefore, the rigidity of the supporting plate 204 can be reduced. The supporting plate 204 can thus be moderately elastically deformed in the vehicle width direction.

It is to be noted that the first and second embodiments represent one mode to which the present invention can be applied, and that the present invention is not limited to the embodiments described above.

The embodiments have been described supposing that the front upper hanger portion 91 and the front lower hanger portion 92 are provided as a front hanger. However, the present invention is not limited to this. It suffices, in certain embodiments, to provide at least one of the front upper hanger portion 91 and the front lower hanger portion 92 as a front hanger.

In addition, certain embodiments have been described supposing that the hanger arms 100L and 100R extend from the rear portions of the pivot frames 15L and 15R which rear portions are in the rear of the suspension coupling bolt 35a to the inside of the frame bodies 80L and 80R as viewed from the side. However, it suffices, in certain embodiments, for the hanger arms 100L and 100R to extend from the rear portions of the pivot frames 15L and 15R irrespective of positional relation of the hanger arms 100L and 100R to the suspension coupling bolt 35a.

DESCRIPTION OF REFERENCE SYMBOLS

1 Motorcycle (saddle riding type vehicle)
10 Engine
12 Swing arm
13 Head pipe
14L, 14R Main frame
15c Pivot supporting hole portion (rear hanger, high-rigidity hanger)
15L, 15R Pivot frame
16 Down frame 17L, 17R Lower frame
22 Upper cross member (cross member)
23 Lower cross member (cross member)
50 Crankshaft
51 Crankcase portion
52 Cylinder portion
80L, 80R Frame body
81 Link member connecting portion (link rod supporting portion)
91 Front upper hanger portion (front hanger, high-rigidity hanger, front upper hanger)
92 Front lower hanger portion (front hanger, high-rigidity hanger, front lower hanger)
94 Rear lower hanger portion (third low-rigidity hanger, low-rigidity hanger)
95 Rear upper hanger portion (second low-rigidity hanger, low-rigidity hanger)
96 Cylinder portion hanger portion (first low-rigidity hanger, low-rigidity hanger)
F Vehicle body frame

The invention claimed is:

1. A saddle-ride type vehicle, comprising:
a vehicle body frame including frame bodies comprising, as viewed from a side, a head pipe, and a pair of left and right main frames extending rearward from the head pipe,
wherein a pair of left and right pivot frames extends downward from rear portions of the main frames,
a down frame extends downward from the head pipe, and
a pair of left and right lower frames extend rearward from a lower end of the down frame and connect to lower ends of the pair of left and right pivot frames, the left and right pivot frames being coupled to each other by a cross member; and
an engine comprising a crankcase portion configured to support a crankshaft, and a cylinder portion extending upward from the crankcase portion,
wherein the engine is supported in a lower portion of the vehicle body frame by a front hanger attached to at least one of the down frame and the lower frames to support a front portion of the crankcase portion,
a rear hanger is attached to the pivot frames to support a rear portion of the crankcase portion,
the front hanger and the rear hanger are high-rigidity hangers having high rigidity,
the engine is supported in the vehicle body frame by a plurality of low-rigidity hangers, wherein at least a portion of the plurality of low-rigidity hangers is disposed between the high-rigidity hangers along the frame bodies of the vehicle body frame,
the front hanger comprises a front upper hanger attached to the down frame to support a front upper portion of the crankcase portion,
a first low-rigidity hanger is disposed on the down frame, and
at least a portion of the first low-rigidity hanger is disposed between the front upper hanger and the rear hanger, as viewed from the side, to support a front portion of the cylinder portion.

2. A saddle-ride type vehicle, comprising:
a vehicle body frame including frame bodies comprising, as viewed from a side, a head pipe, and a pair of left and right main frames extending rearward from the head pipe,
wherein a pair of left and right pivot frames extends downward from rear portions of the main frames,
a down frame extends downward from the head pipe, and
a pair of left and right lower frames extend rearward from a lower end of the down frame and connect to lower ends of the pair of left and right pivot frames, the left and right pivot frames being coupled to each other by a cross member; and
an engine comprising a crankcase portion configured to support a crankshaft, and a cylinder portion extending upward from the crankcase portion,
wherein the engine is supported in a lower portion of the vehicle body frame by a front hanger attached to at least one of the down frame and the lower frames to support a front portion of the crankcase portion,
a rear hanger is attached to the pivot frames to support a rear portion of the crankcase portion,
the front hanger and the rear hanger are high-rigidity hangers having high rigidity,
the engine is supported in the vehicle body frame by a plurality of low-rigidity hangers, wherein at least a portion of the plurality of low-rigidity hangers is disposed between the high-rigidity hangers along the frame bodies of the vehicle body frame,
wherein the front hanger comprises a front upper hanger attached to the down frame to support a front upper portion of the crankcase portion, a front lower hanger is attached to the lower frames to support a front lower portion of the crankcase portion, and the high-rigidity hangers comprise three pieces including the front upper hanger, the front lower hanger, and the rear hanger,
a first low-rigidity hanger is disposed on the down frame, and
at least a portion of the first low-rigidity hanger is disposed between the front upper hanger and the rear hanger, as viewed from the side, to support a front portion of the cylinder portion.

3. The saddle-ride type vehicle according to claim 2,
wherein a second low-rigidity hanger is disposed on an upper cross member coupling upper portions of the left and right pivot frames to each other,
at least a portion of the second low-rigidity hanger is disposed between the front upper hanger and the rear hanger, as viewed from the side, and
the second low-rigidity hanger is configured to support an upper portion of the crankcase portion.

4. The saddle-ride type vehicle according to claim 3,
wherein the main frames extend rearward while bending leftwardly outward and rightwardly outward, respectively, from the head pipe, and the main frames do not include an engine hanger for supporting the engine.

5. The saddle-ride type vehicle according to claim 2,
wherein the pivot frames include a lower cross member configured to couple lower portions of the left and right pivot frames to each other, and include a link rod supporting portion configured to support a swing arm in a rear portion of the lower cross member,
a third low-rigidity hanger is disposed, at least partially, between the front lower hanger and the rear hanger, as viewed from the side, so as to be supported by the link rod supporting portion and so as to straddle the lower cross member, and
the third low-rigidity hanger is configured to support a lower portion of the crankcase portion.

6. The saddle-ride type vehicle according to claim 5,
wherein the lower frames are each a pipe-shaped frame having a smaller cross-sectional area than each of the main frames, the down frame, and the pivot frames.

7. A saddle-ride type vehicle, comprising:
providing means for providing motive power, the providing means comprising crankcase means configured to support a crankshaft, and cylinder portion means extending upward from the crankcase means; and
supporting means for supporting the providing means, the supporting means comprising frame body means comprising, as viewed from a side, head pipe means, and a pair of left and right main frame means extending rearward from the head pipe means,
wherein a pair of left and right pivot frame means extends downward from rear portions of the main frame means,
down frame means extend downward from the head pipe means,
a pair of left and right lower frame means extend rearward from a lower end of the down frame means and connect to lower ends of the pair of left and right pivot frame means, the left and right pivot frame means being coupled to each other by a cross member means,
wherein the providing means is supported in a lower portion of the supporting means by a front hanger means attached to at least one of the down frame means and the lower frame means to support a front portion of the crankcase means,
rear hanger means is attached to the pivot frame means to support a rear portion of the crankcase means,
the front hanger means and the rear hanger means are high-rigidity hanger means having high rigidity,
the providing means is supported in the supporting means by a plurality of low-rigidity hanger means,
at least a portion of the plurality of low-rigidity hanger means is disposed between the high-rigidity hanger means along the frame bodies of the supporting means,
wherein the front hanger means comprises front upper hanger means attached to the down frame means to support a front upper portion of the crankcase means,
first low-rigidity hanger means is disposed on the down frame means, and
at least a portion of the first low-rigidity hanger means is disposed between the front upper hanger means and the rear hanger means, as viewed from the side, to support a front portion of the cylinder means.

8. A saddle-ride type vehicle, comprising:
providing means for providing motive power, the providing means comprising crankcase means configured to support a crankshaft, and cylinder portion means extending upward from the crankcase means; and
supporting means for supporting the providing means, the supporting means comprising frame body means comprising, as viewed from a side, head pipe means, and a pair of left and right main frame means extending rearward from the head pipe means,
wherein a pair of left and right pivot frame means extends downward from rear onions of the main frame means,
down frame means extend downward from the head pipe means,
a pair of left and right lower frame means extend rearward from a lower end of the down frame means and connect to lower ends of the pair of left and right pivot frame means, the left and right pivot frame means being coupled to each other by a cross member means,
the providing means is supported in a lower portion of the supporting means by a front hanger means attached to at least one of the down frame means and the lower frame means to support a front portion of the crankcase means,
rear hanger means is attached to the pivot frame means to support a rear portion of the crankcase means,
the front hanger means and the rear hanger means are high-rigidity hanger means having high rigidity,
the providing means is supported in the supporting means by a plurality of low-rigidity hanger means,
at least a portion of the plurality of low-rigidity hanger means is disposed between the high-rigidity hanger means along the frame bodies of the supporting means,
the front hanger means comprises front upper hanger means attached to the down frame means to support a front upper portion of the crankcase means, front lower hanger means is attached to the lower frame means to support a front lower portion of the crankcase means, and the high-rigidity hanger means comprise three pieces including the front upper hanger means, the front lower hanger means, and the rear hanger means,
first low-rigidity hanger means is disposed on the down frame means, and
at least a portion of the first low-rigidity hanger means is disposed between the front upper hanger means and the rear hanger means, as viewed from the side, to support a front portion of the cylinder means.

9. The saddle-ride type vehicle according to claim 8,
wherein second low-rigidity hanger means is disposed on upper cross member means coupling upper portions of the left and right pivot frame means to each other,
at least a portion of the second low-rigidity hanger means is disposed between the front upper hanger means and the rear hanger means, as viewed from the side, and
the second hanger means is configured to support an upper portion of the crankcase means.

10. The saddle-ride type vehicle according to claim 9,
wherein the main frame means extend rearward while bending leftwardly outward and rightwardly outward, respectively, from the head pipe means, and the main frame means do not include engine hanger means for supporting the providing means.

11. The saddle-ride type vehicle according to claim 8,
wherein the pivot frame means include lower cross member means configured to couple lower portions of the left and right pivot frame means to each other, and include a link rod supporting portion configured to support swing arm means in a rear portion of the lower cross member means,
third low-rigidity hanger means is disposed, at least partially, between the front lower hanger means and the rear hanger means, as viewed from the side, so as to be supported by the link rod supporting portion and so as to straddle the lower cross member means, and
the third low-rigidity hanger means is configured to support a lower portion of the crankcase means.

12. The saddle-ride type vehicle according to claim 11,
wherein the lower frame means is a pipe-shaped frame having a smaller cross-sectional area than each of the main means, the down frame means, and the pivot frame means.

\* \* \* \* \*